(12) United States Patent
Matsudo et al.

(10) Patent No.: US 10,333,121 B2
(45) Date of Patent: Jun. 25, 2019

(54) ELECTRIC STORAGE DEVICE

(71) Applicant: KABUSHIKI KAISHA TOYOTA JIDOSHOKKI, Kariya-shi, Aichi-ken (JP)

(72) Inventors: Akihisa Matsudo, Kariya (JP); Motoaki Okuda, Kariya (JP); Masami Tomioka, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 541 days.

(21) Appl. No.: 14/778,265

(22) PCT Filed: Mar. 20, 2014

(86) PCT No.: PCT/JP2014/057821
§ 371 (c)(1),
(2) Date: Sep. 18, 2015

(87) PCT Pub. No.: WO2014/156983
PCT Pub. Date: Oct. 2, 2014

(65) Prior Publication Data
US 2016/0293917 A1    Oct. 6, 2016

(30) Foreign Application Priority Data

Mar. 25, 2013  (JP) ................. 2013-062159
Apr. 5, 2013   (JP) ................. 2013-079649
Apr. 8, 2013   (JP) ................. 2013-080545

(51) Int. Cl.
*H01M 2/12*      (2006.01)
*H01M 10/0525*   (2010.01)
*H01G 9/12*      (2006.01)

(52) U.S. Cl.
CPC ........... *H01M 2/1241* (2013.01); *H01G 9/12* (2013.01); *H01M 10/0525* (2013.01);
(Continued)

(58) Field of Classification Search
CPC ............... H01G 9/12; H01M 10/0525; H01M 2200/20; H01M 2220/20; H01M 2/1241; Y02T 10/7011; Y02T 10/7022
See application file for complete search history.

(56) References Cited

U.S. PATENT DOCUMENTS

2011/0212350 A1* 9/2011 Sato .................... H01M 2/0404
                                                            429/56
2011/0305946 A1* 12/2011 Moride ................. H01M 2/043
                                                            429/185

FOREIGN PATENT DOCUMENTS

JP   63-102160 A    5/1988
JP   1-309252 A    12/1989
(Continued)

OTHER PUBLICATIONS

International Preliminary Report on Patentability dated Sep. 29, 2015 from the International Searching Authority in counterpart International application No. PCT/JP2014/057821.
(Continued)

*Primary Examiner* — Daniel S Gatewood
(74) *Attorney, Agent, or Firm* — Sughrue Mion, PLLC

(57) ABSTRACT

A secondary battery is provided with an electrode assembly, a case for accommodating the electrode assembly, and a pressure-release valve for releasing the pressure in the case to the outside of the case. The pressure-release valve has a groove including an intersection point. An opening width at a portion of the groove near the intersection point is wider than an opening width at a portion of the groove on the opposite side of the intersection point.

18 Claims, 8 Drawing Sheets

(52) U.S. Cl.
   CPC .... *H01M 2200/20* (2013.01); *H01M 2220/20* (2013.01); *Y02T 10/7011* (2013.01); *Y02T 10/7022* (2013.01)

(56) References Cited

FOREIGN PATENT DOCUMENTS

| | | | |
|---|---|---|---|
| JP | 4-349347 A | 12/1992 | |
| JP | 2002-367583 A | 12/2002 | |
| JP | 2003-297324 A | 10/2003 | |
| JP | 2008-98092 A | 4/2008 | |
| JP | 2009-289637 | * 10/2009 | ............ H01M 2/12 |
| JP | 2009-289637 A | 12/2009 | |
| JP | 2010-165590 A | 7/2010 | |
| JP | 2011-181214 A | 9/2011 | |
| WO | 2010/100731 A1 | 9/2010 | |

OTHER PUBLICATIONS

International Search Report for PCT/JP2014/057821 dated Jun. 3, 2014 [PCT/ISA/210].

* cited by examiner

ELECTRIC STORAGE DEVICE

CROSS REFERENCE TO RELATED APPLICATIONS

This application is a National Stage of International Application No. PCT/JP2014/057821, filed on Mar. 20, 2014, which claims priority from Japanese Patent Application Nos. 2013-062159, filed on Mar. 25, 2013, 2013-079649, filed on Apr. 5, 2013, and 2013-080545, filed on Apr. 8, 2013, the contents of all of which are incorporated herein by reference in their entirety.

TECHNICAL FIELD

The present invention relates to an electric storage device including a pressure release valve that releases pressure out of a case.

BACKGROUND ART

A vehicle such as an electric vehicle (EV) or a plug-in hybrid vehicle (PHV) includes a rechargeable battery, such as a lithium-ion battery, serving as an electric storage device that stores power supplied to an electric motor functioning as a prime mover. Patent publication 1 discloses an example of such type of a rechargeable battery. The rechargeable battery is provided with an electrode assembly including a negative electrode, a positive electrode, and a separator. Negative electrode active material is applied to metal foil in the negative electrode, and positive electrode active material is applied to metal foil in the positive electrode. The separator insulates the negative electrode and the positive electrode. The electrode assembly is formed by stacking the negative electrode, the positive electrode, and the separator in layers. The rechargeable battery has a case that accommodates the electrode assembly and an electrolytic solution. Further, a pressure release valve (gas discharge valve) is arranged on case of the rechargeable battery to release pressure out of the case.

PRIOR ART DOCUMENT

Patent Documents

Patent Document 1: Japanese Laid-Open Patent Publication No. 2011-181214

SUMMARY OF THE INVENTION

Problems that are to be Solved by the Invention

When there are differences in the location where rupturing starts in the pressure release valve, the shape of the valve opening and the open area of the valve would vary. As a result, pressure may not be sufficiently released from the case.

It is an object of the present invention to provide an electric storage device that reduces differences in the opening shape and opening area of the pressure release valve.

Means for Solving the Problem

An electric storage device that achieves the above object includes an electrode assembly, a case that accommodates the electrode assembly, and a pressure release valve that releases pressure out of the case. The pressure release valve includes a groove, which includes a rupture initiation point. A portion of the groove near the rupture initiation point has a larger opening width than a portion of the groove at the opposite side of the rupture initiation point.

In this structure, in the groove, which includes the rupture initiation point, a portion near the rupture initiation point may be set as a location where rupturing starts. Thus, rupturing is apt to starting from the groove. As a result, differences may be reduced in the opening shape and opening area of the pressure release valve.

Preferably, the groove includes an intersecting groove.

In this structure, during the initial rupture stage of the pressure release valve, the intersecting groove allows the pressure release valve to rupture radially. Accordingly, pressure can be released more quickly from the pressure release valve.

Preferably, the pressure release valve includes an arc portion. The arc portion is part of a rim of the pressure release valve. The groove further includes an intersecting groove and arcuate grooves, which are connected to ends of the intersection groove and extended along the arc portion. The pressure release valve includes a first region and a second region. When assuming that a hypothetical line is formed by a line extending along the intersecting groove and intersecting the rim of the pressure release valve, the first region is a region surrounded by the hypothetical line and the rim of the pressure release valve and is a region including a large section contacting the arc portion, the second region is a region surrounded by the hypothetical line and the rim of the pressure release valve and is a region including a small section that contacts the arc portion, and the first region has a larger area than the second region.

In this structure, the first region, which receives the pressure of the case, has a large area. This facilitates the rupturing of the arcuate groove. Accordingly, the opening of the pressure release valve may be enlarged, and the pressure of the case may be quickly released.

Preferable, the rim of the pressure release valve is track-shaped and includes parallel straight portions and the arc portion, which connects the straight portions.

In this structure, the opening of the pressure release valve may be set to be larger than a tetragonal pressure release valve. Accordingly, pressure may be released from the case more quickly.

An electric storage device that achieves the above object includes an electrode assembly, a case that accommodates the electrode assembly, and a pressure release valve that releases pressure out of the case. The pressure release valve includes a groove, which includes a rupture initiation point. The groove includes an angle varying portion that decreases an angle of opening ends at two sides of the groove relative to a deepest portion of the groove between an end of the groove and the rupture initiation point.

In this structure, the angle varying portion of the groove allows the location where the angle is smallest to be set as the location where rupturing starts. Thus, rupturing is apt to starting at this location. As a result, differences may be reduced in the opening shape and opening area of the pressure release valve.

Preferably, the groove is an intersecting groove. The rupture initiation point is an intersection of the intersecting groove.

In this structure, the intersection is set as the location where rupturing starts to allow the pressure release valve to be ruptured in a well-balanced manner. Accordingly, differences may be reduced in the opening shape and opening area of the pressure release valve.

Preferably, the angle varying portion is located in a range from the end to the rupture initiation point.

This structure ensures that the location where the angle is the smallest in the groove is set as the location where rupturing starts.

Preferably, the angle varies at a constant rate in the angle varying portion.

In this structure, the groove is varied in a regular manner. Thus, rupturing may be quickly performed.

An electric storage device that achieves the above object includes an electrode assembly, a case that accommodates the electrode assembly, and a pressure release valve that releases pressure out of the case. The pressure release valve includes a first groove, which includes a rupture initiation point, and a second groove, which is free from the rupture initiation point. The first groove has a first angle of opening ends at two sides of the first groove relative to a deepest portion of the first groove. The second groove has a second angle of opening ends at two sides of the second groove relative to a deepest portion of the second groove. The first angle is smaller than the second angle.

In this structure, the first groove, which has a small angle, may be set as a location where rupturing starts. Thus, rupturing is apt to starting at this location. Accordingly, differences may be reduced in the opening shape and opening area of the pressure release valve.

Preferably, the first groove includes an angle varying portion that decreases the first angle between an end of the first groove and the rupture initiation point.

In this structure, the location where the angle is the smallest in the first groove may be set as a location where rupturing starts. Thus, rupturing is apt to starting at this location. Accordingly, differences may be reduced in the opening shape and opening area of the pressure release valve.

An electric storage device that achieves the above object includes an electrode assembly, a case that accommodates the electrode assembly, and a pressure release valve that releases pressure out of the case. The pressure release valve includes a first rupture portion, which includes a rupture initiation point, and a second rupture portion, which is free from the rupture initiation point. The first rupture portion has a lower mechanical strength than the second rupture portion.

In this structure, the first rupture portion, which includes the rupture initiation point, may be set as the location where rupturing starts. Thus, rupturing is apt to starting from the first rupture portion. As a result, the first groove, which has a small angle, may be set as a location where rupturing starts. Thus, rupturing is apt to starting at this location. Accordingly, differences may be reduced in the opening shape and opening area of the pressure release valve.

Preferably, the pressure release valve includes a rupture groove. The first rupture portion and the second rupture portion include the rupture groove.

In this structure, the rupturing of the first rupture portion and the second rupture portion may be facilitated by the rupture groove. Accordingly, pressure may be released from the case more quickly.

Preferably, the rupture groove includes an intersecting groove. The rupture initiation point is an intersection of the intersecting groove.

In this structure, in the initial rupturing stage of the pressure release valve, the intersecting groove allows the pressure release valve to rupture radially. Accordingly, pressure may be released from the case more quickly.

Preferably, the first rupture portion is annealed.

This structure forms portions that differ in hardness through a simple process.

Preferably, the second rupture portion is shot-peened.

This structure forms portions that differ in hardness through a simple process.

Preferably, the electric storage device is a rechargeable battery.

Effect of the Invention

The present invention provides an electric storage device that reduces differences in the opening shape and opening area of the pressure release valve.

EMBODIMENTS OF THE INVENTION

First Embodiment

A first embodiment of an electric storage device will now be described with reference to FIGS. 1 to 4.

Figure 1:
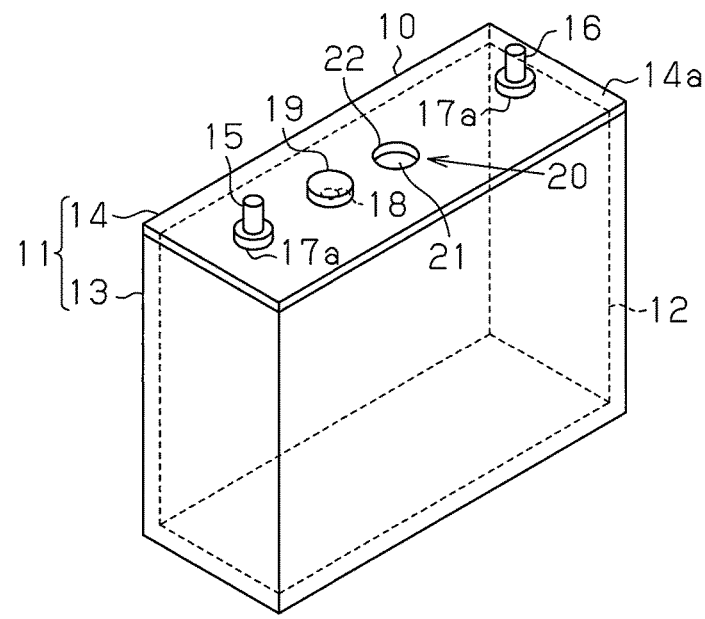
FIG. 1 is a perspective view showing the outer appearance of a rechargeable battery according to a first embodiment of the present invention.

As shown in FIG. 1, a rechargeable battery 10, which serves as an electric storage device, includes a case 11. The case 11 accommodates an electrode assembly 12. The case 11 also accommodates electrolytic solution together with the electrode assembly 12. The case 11 includes a case body 13, which is hollow and has a closed bottom end, and a lid 14, which is flat and closes the open end of the case body 13 through which the electrode assembly 12 is inserted. The case body 13 and the lid 14 are each formed from metal (e.g., stainless steel or aluminum). In the present embodiment, the case body 13 of the rechargeable battery 10 is box-shaped and has a closed bottom end, and the lid 14 has the form of a tetragonal plate. The rechargeable battery 10 has a polygonal outer appearance, and the rechargeable battery 10 is a polygonal battery. In the present embodiment, the rechargeable battery 10 is a lithium-ion battery.

The electrode assembly 12 includes a positive electrode, a negative electrode, and a separator that insulates the positive electrode and the negative electrode. The positive electrode is formed by applying positive electrode active material to opposite sides of a positive electrode metal foil (aluminum foil). The negative electrode is formed by applying negative electrode active material to opposite sides of a negative electrode metal foil (copper foil). A plurality of the positive electrodes and a plurality of the negative electrodes are alternately arranged, and separators are arranged between the positive and negative electrodes. The electrode assembly 12 is a stacked structure formed in this manner. A positive terminal 15 and a negative terminal 16 are electrically connected to the electrode assembly 12. A portion of the positive terminal 15 and a portion of the negative terminal 16 extend out of the case 11. An insulation ring 17a is coupled to each of the positive terminal 15 and the negative terminal 16 to insulate the positive terminal 15 and the negative terminal 16 from the case 11.

The lid 14 of the case 11 includes a liquid inlet 18. Electrolytic solution is supplied into the case 11 (case body 13) through the liquid inlet 18. A sealing member 19 closes the liquid inlet 18. The sealing member 19 is fixed to the outer surface 14a of the lid 14 and exposed to the outside of the case 11. The pressure release valve 20 ruptures when the pressure of the case 11 reaches a release pressure, which is a predetermined pressure, to communicate the outer and inner sides of the case 11 so that the pressure of the case 11 does not rise excessively. In this embodiment, the pressure release valve 20 is located in the lid 14 of the case 11. Further, the sealing member 19 (liquid inlet 18) and the pressure release valve 20 are arranged next to each other on the lid 14. The release pressure of the pressure release valve 20 is set to a pressure allowing for rupturing before the case 11 or the portion joining the case body 13 and the lid 14 starts to crack or break. Further, the pressure release valve 20 includes a valve member 21, which has the form of a thin plate and has a smaller thickness than the valve member 21. The valve member 21 is formed integrally with the lid 14 and located at the bottom of a recess 22 in the upper surface of the lid 14.

Figure 2:
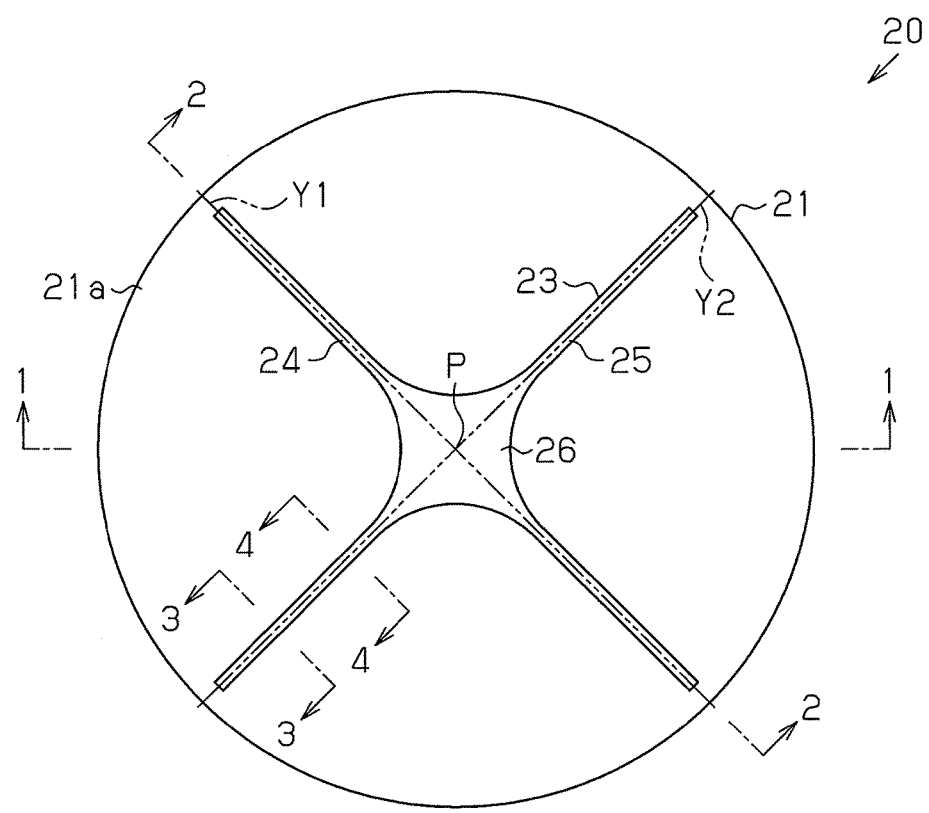
FIG. 2 is a plan view showing the outer surface of the pressure release valve of FIG. 1.

As shown in FIG. 2, the pressure release valve 20 has a circular rim. The valve member 21 is connected to the rim of the pressure release valve 20 and circular like the pressure release valve 20.

The valve member 21 has an outer surface 21a including an intersecting groove 23. The intersecting groove 23 includes two linear grooves 24 and 25 and a recess groove 26. The linear grooves 24 and 25 are grooves that are identical in shape. In the present embodiment, the linear grooves 24 and 25 are V-shaped grooves. The recess groove 26 extends along each of the linear grooves 24 and 25. When hypothetical lines Y1 and Y2 intersect the rim of the pressure release valve 20, the recess groove 26 is located in a region including the intersection P of the hypothetical lines Y1 and Y2, which is the center position of the intersecting groove 23. The recess groove 26 is a groove having an opening with a tetragonal shape. Further, the recess groove 26 has the same depth as the linear grooves 24 and 25. In the present embodiment, the intersection P of the hypothetical lines Y1 and Y2 are located at the central part of the valve member 21. The recess groove 26 includes the central part of the valve member 21 and is arranged in a region surrounding the central part.

Figure 3:
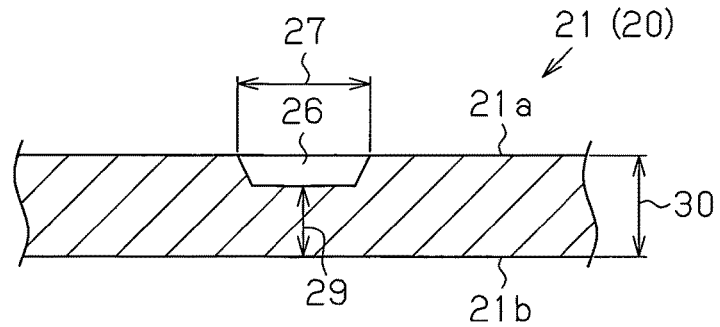
FIG. 3 is a cross-sectional view taken along line 1-1 in FIG. 2.
Figure 4:
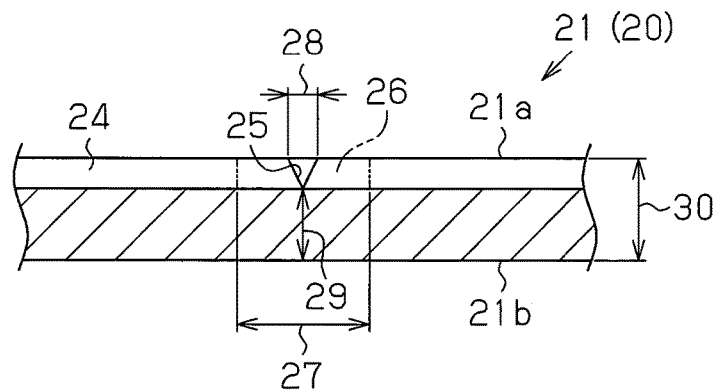
FIG. 4 is a cross-sectional view taken along line 2-2 in FIG. 2.

As shown in FIGS. 3 and 4, the opening width 27 of the recess groove 26 is larger than the opening width 28 of the linear grooves 24 and 25. Thus, in the present embodiment, due to the recess groove 26 located at the center position of the intersecting groove 23, the opening width is large in the vicinity of the center position (intersection P) of the intersecting groove 23. Due to the linear grooves 24 and 25 located distant from the center position of the intersecting groove 23, the opening width is small at the side of the intersecting groove 23 opposite to the center position (intersection P).

As shown in FIGS. 3 and 4, the pressure release valve 20 includes a thin film portion 29 located between the bottom of the recess groove 26 and the inner surface 21b of the valve member 21 and between the bottom of each of the linear grooves 24 and 25 and the inner surface 21b of the valve member 21. The thin film portions 29 is thinner by an amount corresponding to the depth of the intersecting groove 23 than portions of the valve member 21 where the intersecting groove 23 is not formed. Thus, the thin film portion 29 has a smaller thickness than the thickness 30 of the valve member 21. Further, the opening width of the recess groove 26 is larger than the opening width of the linear grooves 24 and 25. The pressure applied from the inner side of the case 11 is apt to concentrating around the intersection P, which is located in the recess groove 26. Thus, the intersection P serves as a rupture initiation point from where the valve member 21 starts to rupture.

The operation of the first embodiment will now be described.

The pressure of the case 11 is received by the inner surface 21b of the valve member 21, which serves as a pressure receiving surface, and applied to the valve member 21 so as to outwardly expand the valve member 21. Further, the pressure applied from the inner side of the case generates stress at the intersecting groove 23 of the valve member 21.

In this embodiment, the recess groove 26, which has a large opening width, is arranged to surround the intersection P of the intersecting groove 23 that serves as the rupture initiation point. Thus, the pressure applied from the inner side of the case 11 is apt to concentrating at the recess groove, and rupturing of the valve member 21 easily starts from the recess groove 26.

When the pressure of the case 11 reaches the release pressure, the recess groove 26 starts to rupture. The rupturing of the recess groove 26 leads to the rupturing of the linear grooves 24 and 25. In this manner, when the intersecting groove 23 ruptures in the outer surface 21a of the valve member 21, the valve member 21 is separated into a number of regions and torn toward the outer side. This forms a large opening in the pressure release valve 20. Pressure is released from the case 11 through the opening formed in the pressure release valve 20.

Accordingly, the first embodiment has the effects (advantages) described below.

(1) The recess groove 26 may be set as a location where the recess groove 26 of the intersecting groove 23 starts to rupture. Thus, rupturing is apt to starting from the recess groove 26. This reduces differences in the opening shape and the opening area of the pressure release valve 20 and allows the pressure of the case 11 to be sufficiently released.

(2) The valve member 21 includes the intersecting groove 23. Thus, in an initial rupturing stage, rupturing occurs radially due to the intersecting groove 23. Accordingly, when pressure is released from the case 11, the pressure is released more quickly.

(3) The intersection P is located in the central part of the valve member 21. Thus, the valve member 21 may be ruptured in a well-balanced manner.

(4) The intersecting groove 23 is a groove that communicates the linear grooves 24 and 25 with the recess groove 26. Thus, when rupturing starts from the recess groove 26, the rupturing may be quickly transmitted to the linear grooves 24 and 25. Accordingly, when pressure is released from the case 11, the pressure is released more quickly.

Second Embodiment

A second embodiment of an electric storage device will now be described with reference to FIG. 5.

In the embodiments described hereafter, structures identical to embodiments that have already been described will not be described in detail.

Figure 5:
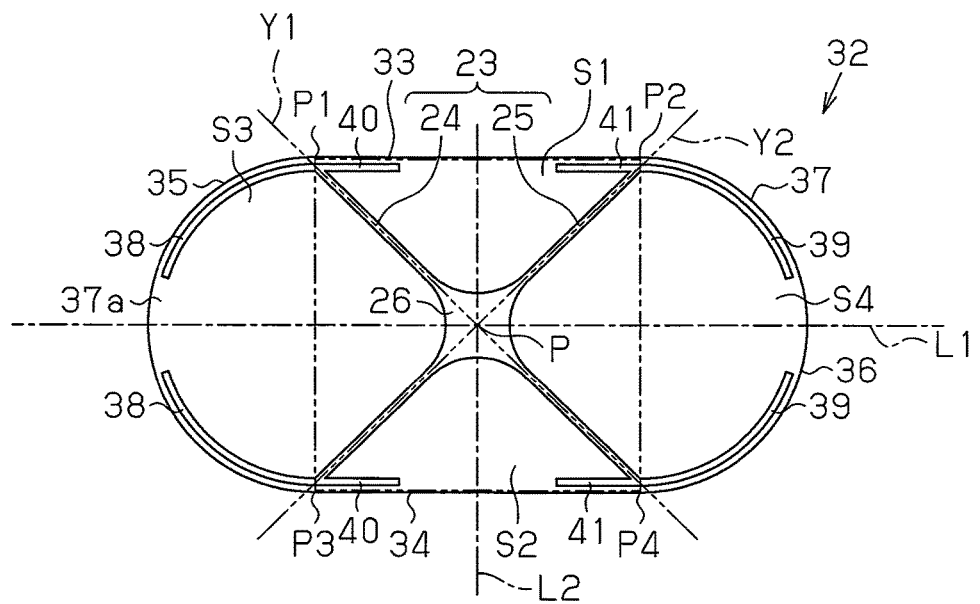
FIG. 5 is a plan view showing the outer surface of a pressure release valve according to a second embodiment of the present invention.

As shown in FIG. 5, a pressure release valve 32 of the present embodiment includes has a track-shaped (oval) rim that includes two parallel straight portions 33 and 34 and two arc portions 35 and 36, which connect the straight portions 33 and 34. A valve member 37 of the pressure release valve 32 is connected to the rim of the pressure release valve 32 and track-shaped (oval) like the pressure release valve 32.

The arc portion 35 includes one end connected to one end of the straight portion 33 and another end connected to one end of the straight portion 34. The arc portion 36 includes one end connected to the other end of the straight portion 33 and another end connected to the other end of the straight portion 34. Thus, in the present embodiment, one of the ends of each of the straight portions 33 and 34 is connected to the arc portion 35, which is entirely arcuate. The other end of each of the straight portions 33 and 34 is connected to the arc portion 36, which is entirely arcuate. In the pressure release valve 32, the portions where the ends of the straight portions 33 and 34 are connected to the ends of the arc portions 35 and 36 define interfaces P1, P2, P3, and P4 of the straight portions 33 and 34 and the arc portions 35 and 36.

The valve member 37 has an outer surface 37a including grooves. The grooves include an intersecting groove 23, arcuate grooves 38 and 39, which extend along the arc portions 35 and 36, and straight grooves 40 and 41, which extend along the straight portions 33 and 34. In the present embodiment, each of the arcuate grooves 38 and 39 and the straight grooves 40 and 41 is a V-shaped groove.

In the same manner as the first embodiment, the intersecting groove 23 includes two linear grooves 24 and 25 and a recess groove 26. The recess groove 26 extends along each of the linear grooves 24 and 25. When hypothetical lines Y1 and Y2 intersect the rim of the pressure release valve 32, the recess groove 26 is located in a region including the intersection P of the hypothetical lines Y1 and Y2, which is the center position of the intersecting groove 23. In the present embodiment, the hypothetical line Y1 intersects a hypothetical line indicated in the drawing by a double-dashed line connecting the interfaces P1 and P3. The hypothetical line Y1 also intersects the arc portion 35 that is the rim of the pressure release valve 32. Further, the hypothetical line Y2 intersects a hypothetical line indicated in the drawing by a double-dashed line connecting the interfaces P2 and P4. The hypothetical line Y2 also intersects the arc portion 36 that is the rim of the pressure release valve 32. In the present embodiment, the intersection P of the hypothetical lines Y1 and Y2 are located at the central part of the valve member 37. The recess groove 26 includes the central part of the valve member 37. Thus, the recess groove 26 includes the central part of the valve member 37 and is arranged in a region surrounding the central part.

In the second embodiment, as described in the first embodiment with reference to FIGS. 3 and 4, the opening width of the recess groove 26 is larger than the opening width of the linear grooves 24 and 25. Further, in the present embodiment, as described in the first embodiment with reference to FIGS. 3 and 4, a thin film portion 29 is located between the bottom of the recess groove 26 and the inner surface of the valve member 37 and between the bottom of each of the linear grooves 24 and 25 and the inner surface of the valve member 37. In the present embodiment, the intersection P, which is located in the recess groove 26, serves as a rupture initiation point from where the valve member 37 starts to rupture.

Further, the outer surface 37a of the valve member 37 includes two arcuate grooves 38, which extend along the arc portion 35, and two arcuate grooves 39, which extend along the arc portion 36. The arcuate grooves 38 and 39 are grooves that are identical in shape and have the same depth as the linear grooves 24 and 25. One of the two arcuate grooves 38 is connected to one of the ends of the linear groove 24 located in the vicinity of the interface P1 and extended in an arcuate manner along the arc portion 35. Further, one of the two arcuate grooves 39 is connected to one of the ends of the linear groove 25 located in the vicinity of the interface P2 and extended in an arcuate manner along the arc portion 36. The other one of the two arcuate grooves 38 is connected to the other one of the ends of the linear groove 25 located in the vicinity of the interface P3 and extended in an arcuate manner along the arc portion 35. Further, the other one of the two arcuate grooves 39 is connected to the other one of the ends of the linear groove 24 located in the vicinity of the interface P4 and extended in an arcuate manner along the arc portion 36. Each of the arcuate grooves 38 and 39 has a length set so that the end at the opposite side of the end connected to the linear groove 24 or 25 is located at a position separated by a predetermined distance from a bisector L1. The bisector L1 is a straight line indicated by a single-dashed line in the drawing and bisects the valve member 37 in a direction perpendicular to the direction in which the straight portions 33 and 34 extend. That is, each of the arcuate grooves 38 and 39 is arranged along part of the arc portion 35 or 36. Thus, in the valve member 37, one of each of the arcuate grooves 38 and 39 is connected to the linear groove 24, and one of each of the arcuate grooves 38 and 39 is connected to the linear groove 25.

Further, the outer surface 37a of the valve member 37 includes two straight grooves 40 and 41, which extend along the straight portion 33, and two straight grooves 40 and 41, which extend along the straight portion 34. The straight grooves 40 and 41 are identical in shape and have the same depth as the linear grooves 24 and 25. One of the two straight grooves 40 is connected to one of the ends of the linear groove 24 located in the vicinity of the interface P1 and extended along the straight portion 33 in a linear manner. Further, one of the two straight grooves 41 is connected to one of the ends of the linear groove 25 located in the vicinity of the interface P2 and extended along the straight portion 33 in a linear manner. The other one of the two straight grooves 40 is connected to the other end of the linear groove 25 located in the vicinity of the interface P3 and extended along the straight portion 34 in a linear manner. Further, the other one of the two straight grooves 41 is connected to the other end of the linear groove 24 located in the vicinity of the interface P4 and extended along the straight portion 34 in a linear manner.

Each of the straight grooves 40 and 41 has a length set so that the end at the opposite side of the end connected to the linear groove 24 or 25 is located at a position separated by a predetermined distance from normal L2. The normal L2 is a straight line extending perpendicular to the bisector L1 and through the intersection P. That is, each of the straight grooves 40 and 41 extends along part of the straight portion 33 or 34. Thus, in the valve member 37, one of each of the straight grooves 40 and 41 is connected to the linear groove 24, and one of each of the straight grooves 40 and 41 is connected to the linear groove 25.

When assuming that the hypothetical lines Y1 and Y2 extend along the intersecting groove 23, the outer surface 37a of the valve member 37 includes regions S1, S2, S3, and S4 surrounded by the hypothetical lines Y1 and Y2 and the rim of the pressure release valve 32. Region S1 is defined by a portion of the hypothetical line Y1 located between the intersection P of the hypothetical lines Y1 and Y2 and the intersection of the hypothetical line Y1 and the arc portion 35, a portion of the hypothetical line Y2 located between the intersection P and the intersection of the hypothetical line Y2 and the arc portion 36, and the straight portion 33. Region S2 is defined by a portion of the hypothetical line Y2 located between the intersection P and the intersection of the hypothetical line Y2 and the arc portion 35, a portion of the hypothetical line Y1 located between the intersection P and the intersection of the hypothetical line Y1 and the arc portion 36, and the straight portion 34. Region S1 and region S2 are symmetric with respect to the intersection P.

Region S3 is defined by a portion of the hypothetical line Y1 located between the intersection P and the intersection of the hypothetical line Y1 and the arc portion 35, a portion of the hypothetical line Y2 located between the intersection P and the intersection of the hypothetical line Y2 and the arc portion 35, and the arc portion 35. Region S4 is defined by a portion of the hypothetical line Y2 located between the intersection P and the intersection of the hypothetical line Y2 and the arc portion 36, a portion of the hypothetical line Y1 located between the intersection P and the intersection of the hypothetical line Y1 and the arc portion 36, and the arc portion 36. Region S3 and region S4 are symmetric with respect to the intersection P.

In the present embodiment, the regions S1 and S2 include the straight portions 33 and 34, entirely contact the straight portions 33 and 34, and slightly contact the arc portions 35 and 36. Further, in the present embodiment, the regions S3 and S4 include the arc portions 35 and 36 and substantially contact the entire arc portions 35 and 36. In the present embodiment, the regions S1 and S2 define a second region in which the section contacting the arc portions 35 and 36 is small, and the regions S3 and S4 define a first region in which the section contacting the arc portions 35 and 36 is large. The four regions S1 to S4 located in the outer surface 37a of the valve member 37 are set so that the regions S3 and S4, which include a large section contacting the arc portions 35 and 36, have a larger area than the regions S1 and S2, which include a small section contacting the arc portions 35 and 36.

The operation of the second embodiment will now be described.

This embodiment is also provided with the intersecting groove 23 that includes the two linear grooves 24 and 25 and the recess groove 26. Thus, in the same manner as the first embodiment, the pressure applied from the inner side of the case 11 is apt to concentrating at the recess groove 26, and rupturing of the valve member 37 is apt to starting from the recess groove 26.

Further, in the present embodiment, when the recess groove 26 starts to rupture and the rupturing of the linear grooves 24 and 25 reaches the ends connected to the arcuate grooves 38 and 39, the straight grooves 40 and 41 start to rupture as the arcuate grooves 38 and 39 rupture. The rupturing separates the valve member 21 into the four regions S1 to S4 along the grooves defining the regions S1 to S4.

In the present embodiment, the regions S3 and S4, which have a large section contacting the arc portions 35 and 36, have a larger area than the regions S1 and S2, which have a larger section contacting the straight portions 33 and 34. That is, the regions S3 and S4 have a larger pressure receiving area than the regions S1 and S2. Thus, the amount of pressure received by the inner surface of the valve member 37 from the inner side of the case 11 is larger at the regions S3 and S4 than the regions S1 and S2.

Accordingly, in addition to the first to fourth effects, or advantages, of the first embodiment, the second embodiment has the effects described below. Here, the third effect is to be understood by substituting "the valve member 21" with "the valve member 37."

(5) The arcuate grooves 38 and 39 are more difficult to rupture than the linear grooves 24 and 25. Thus, the areas of the regions S3 and S4, which have large sections contacting the arc portions 35 and 36, are set to be larger than the areas of the regions S3 and S4, which have small sections contacting the arc portions 35 and 36, to increase the pressure receiving amount of the regions S3 and S4. Accordingly, even though the pressure release valve 32 includes the arcuate grooves 38 and 39, which extend along the arc portions 35 and 36, to enlarge the opening of the pressure release valve 32, the regions S3 and S4 easily open toward the outer side by facilitating the rupturing of the arcuate grooves 38 and 39. As a result, the pressure release valve 32 opens in a well-balanced manner. This allows for the enlargement of the opening of the pressure release valve 32. In other words, pressure may be quickly released from the case 11.

If the pressure receiving amount of the regions S3 and S4, which contact the arc portions 35 and 36, is small, the rupturing of the arcuate grooves 38 and 39 may be insufficient. That is, when the pressure release valve 32 opens in an unbalanced manner, the arcuate grooves 38 and 39 will not rupture sufficiently. As a result, the opening of the pressure release valve 32 will be small. Accordingly, pressure will not be quickly released from the case 11.

(6) The intersecting groove 23 includes the two linear grooves 24 and 25. Thus, the linear grooves 24 and 25 facilitate rupturing when the valve member 37 starts to rupture. This releases pressure from the case 11 more quickly.

(7) The pressure release valve 32 is track-shaped (oval). Thus, a large opening may be set for the pressure release valve 32 as compared with when the pressure release valve 32 is tetragonal. This allows pressure to be quickly released from the case 11.

(8) The linear grooves 24 and 25 are extended to the vicinities of the interfaces P1 to P4. This allows the arcuate grooves 38 and 39 to be extended along the arc portions 35 and 36. Accordingly, when each groove of the valve member 37 ruptures, the opening of the pressure release valve 32 may be enlarged.

(9) The linear grooves 24 and 25 are connected to the arcuate grooves 38 and 39. Thus, after the linear grooves 24 and 25 rupture, the rupturing of the linear grooves 24 and 25 may be quickly shifted to the opening of the arcuate grooves 38 and 39. The rupturing of the linear grooves 24 and 25 separates the pressure release valve 32 into the regions S1 to S4 and tears the valve member 37 toward the outer side as the rupturing advances thereby forming an opening. Pressure is released from the case 11 through the opening. Thus, by quickly shifting rupturing from the linear grooves 24 and 25 to the rupturing of the arcuate grooves 38 and 39, a sufficient opening amount may be ensured for the pressure release valve 32.

(10) The straight grooves 40 and 41 facilitate the outward tearing of the regions S1 and S2. That is, the rupturing of the straight grooves 40 and 41 allow the regions S1 and S2 to open toward the outer side. As a result, the pressure release valve 32 opens in a well-balanced manner, and the opening of the pressure release valve 32 may be enlarged. This allows pressure to be quickly released from the case 11.

(11) The arcuate grooves 38 and 39 are arranged along parts of the arc portions 35 and 36. Further, the straight grooves 40 and 41 are arranged along parts of the straight portions 33 and 34. Thus, even when the grooves rupture and tears the valve member 37 toward the outer side, the valve member 37 is connected at locations free from grooves. This prevents the scattering of fragments of the valve member 37.

The first and second embodiments may be modified as described below.

Figure 6A:
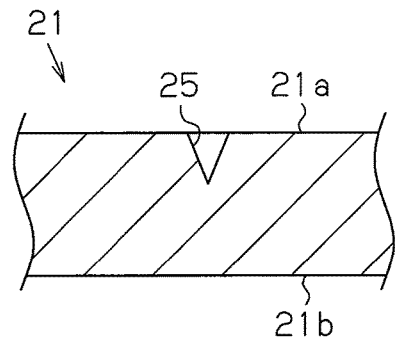
FIG. 6A is a cross-sectional view of a further example taken along line 3-3 in FIG. 2.
Figure 6B:
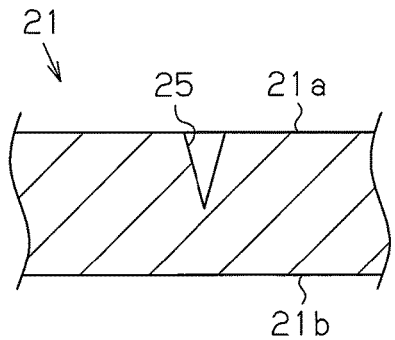
FIG. 6B is a cross-sectional view of the further example taken along line 4-4 in FIG. 2.

In the first embodiment, as shown in FIGS. 6A and 6B, the depth of the intersecting groove 23 may be varied. When varying the groove depth, it is preferred that the groove depth increases toward the intersection P, which is where rupturing starts. FIG. 6A is a cross-sectional view of this modified example taken along line 3-3 in FIG. 2, and FIG. 6B is a cross-sectional view of this modified example taken along line 4-4 in FIG. 2. As shown in FIGS. 2, 6A, and 6B, the groove depth is small near the rim of the valve member, and the groove depth is large near the intersection P near the intersection P. In this manner, by increasing the groove depth toward the valve member, the thickness of the thin portion overlapped with the bottom of the groove becomes thin toward the intersection P. Thus, the pressure applied from the inner side of the case 11 is apt to further concentrate at the recess groove 26, and the rupturing of the valve member 21 starts further easily from the recess groove 26. It is preferred that the groove depth vary at a constant rate toward the intersection P. The term "vary at a constant rate" not only refers to a situation in which the groove depth varies continuously at a constant rate but also refers to a situation in which the groove depth varies in a stepped manner with the varied amount is constant in each step. The depth of the recess groove 26 may be fixed and may increase toward the intersection P. This modified example may be applied to the intersecting groove 23 of the second embodiment or to the structure of a modified example shown in FIG. 7, which will be described below.

Figure 7:
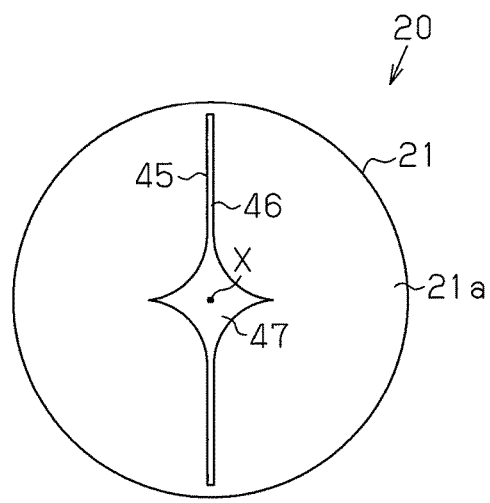
FIG. 7 is a plan view showing the outer surface of a pressure release valve in a further example.

As shown in FIG. 7, the outer surface 21a of the valve member 21 in the pressure release valve 20 may include a non-intersecting groove 45 that serves as a groove including the rupture initiation point. For example, the non-intersecting groove 45 may include a single linear groove 46 and a recess groove 47, which is located at a position including the central position X of the linear groove 46. The recess groove 47 is similar to the recess groove 26 of the first and second embodiments. In the modified example, the central position X serves as the rupture initiation point. In such a structure, the pressure applied from the inner side of the case 11 is apt to concentrating at the recess groove 47, and the rupturing of the valve member 21 is apt to starting from the recess groove 47. This modified example is not limited to the pressure release valve 20 that has a circular rim and may also be applied to the pressure release valve 32 that has a track-shaped (oval) rim like in the second embodiment.

Figure 8A:
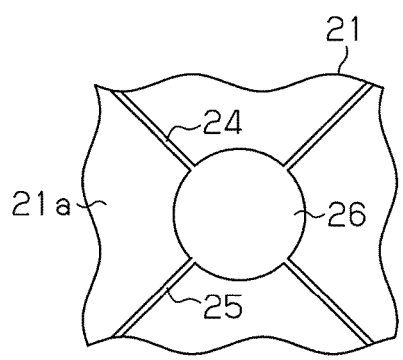
FIGS. 8A and 8B are plan views each partially showing the outer surface of a pressure release valve in a further example.
Figure 8B:
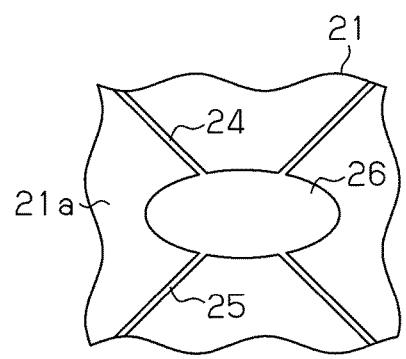

As shown in FIGS. 8A and 8B, the recess groove 26 in the intersecting groove 23 located in the outer surface 21a of the valve member 21 may be changed in shape. FIG. 8A shows an example in which the recess groove 26 is circular, and FIG. 8B shown an example in which the recess groove is elliptic. The recess groove 26 may be changed to any shape as long as the groove includes the rupture initiation point. In such a case, the same advantages as the above embodiment may be obtained. In FIGS. 8A and 8B, the shape of the recess groove 26 may be applied to the recess groove 26 of the second embodiment or the recess groove 47 of the modified example shown in FIG. 7.

The opening width of the intersecting groove 23 may be changed to increase toward the rupture initiation point, and the varied amount of the opening width may be varied. For example, in the intersecting groove 23, the opening width of a portion farthest from the intersection P (in the above embodiments, the portion of the linear grooves 24 and 25) may be the narrowest, and the opening width may increase continuously as the intersection point P becomes closer. Further, in the intersecting groove 23, the portion farthest from the intersection P (portion of the linear grooves 24 and 25 in the above embodiments) may have the narrowest opening width, and the opening width may be increased in a stepped manner at portions closer to the intersection P. This modified example may be applied to the structure of the modified example shown in FIG. 7.

The intersecting groove 23 may be changed to be Y-shaped instead of being X-shaped.

The grooves of the valve members 21 and 37 may be located in the inner surface.

The cross-sectional shape of each groove may be changed.

The case 11 may be changed in shape. For example, the case 11 may be tubular.

The pressure release valves 20 and 32 may be components separate from the case 11, and the pressure release valves 20 and 32 may be joined with the case 11. The joining is performed through, for example, welding (e.g., laser welding).

The electrode assembly 12 does not have to be of a stacked type and may be of a wound type in which strips of positive electrodes and strips of negative electrodes are stacked as layers.

The rechargeable battery 10 is not limited to a lithium ion battery and may be a different type of rechargeable battery.

It is only necessary that ions be moved and charges be transferred between the positive electrode active layer and the negative electrode active layer. Further, the electric storage device may be a capacitor.

The rechargeable battery 10 may be installed as a vehicle power supply device in an automobile or in an industrial vehicle. Further, the rechargeable battery may be applied to a stationary electric storage device.

The hypothetical lines Y1 and Y2 may be lines extending through an opening width central part of a groove or a line that extends through the open end of a groove. In any case, the hypothetical lines Y1 and Y2 extend along grooves.

In the second embodiment, the linear grooves 24 and 25 may be arranged so that the hypothetical line Y1 is a line that connects the interfaces P1 and P4 and the hypothetical line Y2 is a line that connects the interfaces P2 and P3. The regions S3 and S4 have larger areas than the regions S1 and S2 even when the hypothetical lines Y1 and Y2 are arranged like in the present modified example. This also obtains the same effects as the above embodiment.

In the second embodiment, the hypothetical lines Y1 and Y2 may intersect the arc portions 35 and 36 at locations separated from the interfaces P1 to P4 along the arc portions 35 and 36. In this case, the hypothetical lines Y1 and Y2 intersect the rim of the arc portions 35 and 36 in the same manner as the linear grooves 24 and 25. Here, the regions S1 to S4 are set so that the area of the regions including large sections contacting the arc portions 35 and 36 is greater than the area of the regions including small sections contacting the arc portions 35 and 36. This also obtains the same effects as the above embodiment.

In the second embodiment, the linear grooves 24 and 25 do not have to be located on the hypothetical lines Y1 and Y2 that intersect the arc portions 35 and 36 and may be located in regions where the interface side ends located in the same straight portions 33 and 34 approach each other. In this case, the hypothetical lines Y1 and Y2 are extended along the linear grooves 24 and 25 and intersect the straight portions 33 and 34. This obtains the same effects as the above embodiment.

In the second embodiment, the pressure release valve 32 may be changed in shape as long as the shape includes the arc portions. For example, the pressure release valve 32 may be elliptic or circular. Further, the pressure release valve 32 may be shaped so that one of the ends of the straight portions 33 and 34 is connected by an arc portion, and the other ends are connected by a straight portion. Moreover, the arc portion connecting one of the ends of the straight portions 33 and 34 may differ in shape from the arc portion connecting the other ends of the straight portions 33 and 34. This obtains the same effects as the above embodiment.

In the second embodiment, the arcuate grooves 38 and 39 and the straight grooves 40 and 41 do not have to be connected to the linear grooves 24 and 25. This obtains the same effects as the above embodiment.

In the second embodiment, the valve member 37 may include only the intersecting groove 23 and the arcuate grooves 38 and 39 and do not have to include the straight grooves 40 and 41. In this case, the intersecting groove 23 and the arcuate grooves 38 and 39 may be connected like in the above embodiment or be disconnected like in the above modified example. This obtains the same effects as the above embodiment.

Third Embodiment

A third embodiment of an electric storage device will now be described with reference to FIGS. 9 and 10.

In the description hereafter, same reference numerals are given to those components that are the same as the components of the embodiments described above. Such components will not be described in detail.

Figure 9:
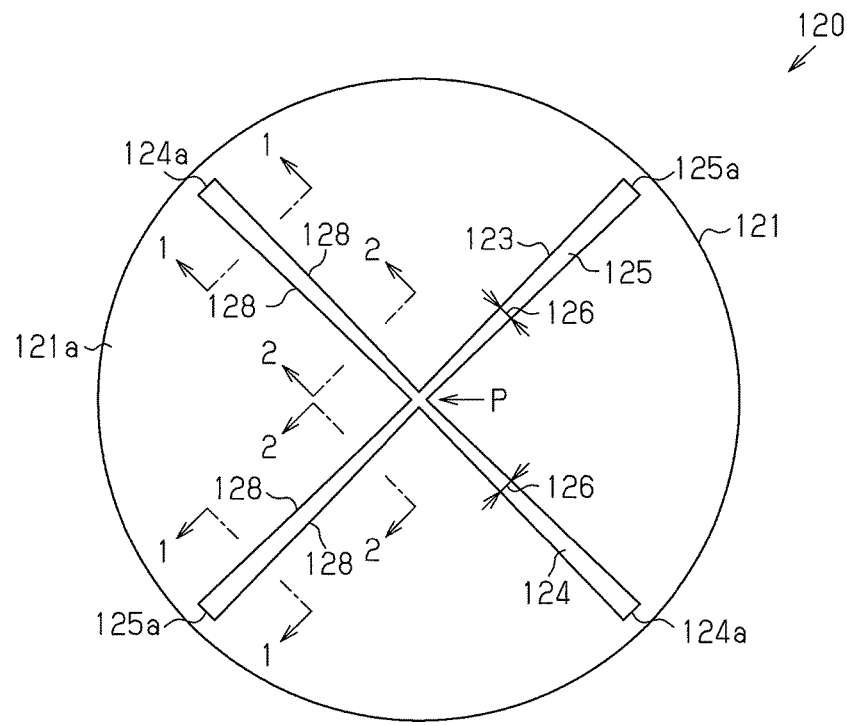
FIG. 9 is a plan view showing the outer surface of a pressure release valve according to a third embodiment of the present invention.

As shown in FIG. 9, the pressure release valve 120 includes a circular rim. A valve member 121, which is connected to the rim of the pressure release valve 120, is circular like the pressure release valve 120.

The valve member 121 has an outer surface 121*a* including an intersecting groove 123. The intersecting groove 123 is formed by two linear grooves 124 and 125 extending straight within the rim of the valve member 121. The intersecting groove 123 includes an intersection P located at a position where the two linear grooves 124 and 125 intersect. In the present embodiment, the intersection P of the intersecting groove 123 is located at the central part of the valve member 121. Further, the two linear grooves 124 and 125 intersect at the intersection P, and the two ends 124*a* and 125*a* respectively corresponding to the linear grooves 124 and 125 are located in vicinity of the rim of the valve member 121. The two linear grooves 124 and 125 each have an opening width 126 that becomes smaller from each of the ends 124*a* and 125*a* toward the intersection P, and the opening width 126 becomes the smallest at the intersection P. The term "opening width" refers to the width between the two sides of each of the linear grooves 124 and 125 bordering the outer surface 121*a* of the valve member 121 and located at positions orthogonal to the extending direction of the linear grooves 124 or 125 in the outer surface 121*a* of the valve member 121.

Figure 10A:
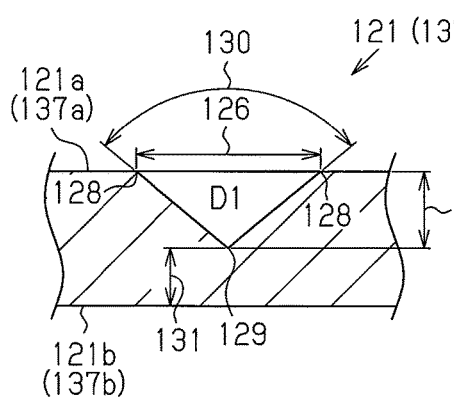
FIG. 10A is a cross-sectional view taken along line 1-1 in FIG. 9.
Figure 10B:
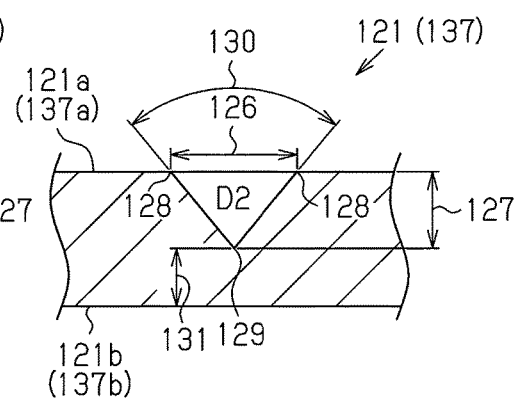
FIG. 10B is a cross-sectional view taken along line 2-2 in FIG. 9.

As shown in FIGS. 10A and 10B, the linear groove 124 ("D1" and "D2" in the drawings) has a depth 127 that is the same in the extending direction of the linear groove 124. An angle 130 of the opening ends 128 at the two sides of the linear groove 124 relative to the deepest portion 129 of the linear groove 124 decreases in a range from the end 124*a* of the linear groove 124 to the intersection P. The decrease in the angle 130 reduces the opening width 126 of the linear groove 124 from the ends 124*a* toward the intersection P as shown in FIG. 9. A groove depth 127 is the length obtained when connecting the deepest portion 129 of the groove and the surface of the valve member in the thickness direction of the valve member. Further, the two opening ends 128 of the groove are located at positions where the surface of the valve member intersects groove surfaces extending from the deepest portion 129 of the groove to the surface of the valve member.

The angle 130 varies at a constant rate from the ends 124*a* to the intersection P. The phrase varies at a constant rate not only means that the angle is varied continuously by a constant varying amount but also means that the angle is varied in a stepped manner with the varying amount being constant for each step. In this embodiment, the angle 130 of the linear groove 124 varies continuously and the varying amount is constant. The decrease in the angle 130 forms an angle varying portion in the grooves of the valve member 121.

The linear groove 125 has the same shape as the linear groove 124 and includes an angle varying portion like the linear groove 124. Thus, as shown in FIGS. 10A and 10B, the angle 130 of the opening ends 128 of the linear groove 124 relative to the deepest portion 129 of the linear groove 125 ("D1" and "D2" in the drawing) decreases in a range from the ends 125*a* of the linear groove 125 to the intersection P. The valve member 121 of the pressure release valve 120 includes a thin film portion 131 between the bottom of each of the linear grooves 124 and 125 and the inner surface 121b of the valve member 121. The thin film portion 131 is thinner than the valve member 121.

The present embodiment will now be described.

In the present embodiment, the angle 130 of the linear grooves 124 and 125 is the smallest at the intersection P. Thus, the angle 130 of the linear grooves 124 and 125 at the intersection P is more acute than the angle of groove portions other than the intersection P. As a result, the pressure applied from the inner side of the case 11 (refer to FIG. 1) is apt to concentrating at the intersection P, and rupturing of the valve member 121 is apt to starting from the intersection P. That is, the intersection P serves as a rupture initiation point from where the valve member 121 starts to rupture.

When the pressure of the case 11 reaches the release pressure, the intersecting groove 123 ruptures from the intersection P. When the intersecting groove 123 located in the outer surface 121a of the valve 121 ruptures, the valve member 121 is separated into a number of regions and torn toward the outer side. This forms a large opening in the pressure release valve 120. The pressure of the case 11 is released out of the case 11 through the opening formed in the pressure release valve 120.

Accordingly, the third embodiment has the effects (advantages) described below.

(12) The intersection P of the intersecting groove 123 may be set as the location where rupturing starts. Thus, rupturing is apt to starting from the intersection P. As a result, differences may be reduced in the opening shape and opening area of the pressure release valve 120. This allows pressure to be sufficiently released from the case 11.

(13) The intersection P of the intersecting groove 123 is set as the location where rupturing starts. This allows the pressure release valve 120 to be ruptured in a well-balanced manner. Accordingly, differences may be reduced in the opening shape and opening area of the pressure release valve 120.

(14) The valve member 121 includes the intersecting groove 123. The intersecting groove 123 results in radial rupturing during the initial rupturing stage. This allows pressure to be released more quickly from the case 11.

(15) The angle 130 is varied at a constant rate. Thus, the intersecting groove 123 is a groove varied in a regular manner. This stabilizes the rupturing load and allows for quick rupturing.

(16) The intersection P is located at the central part of the valve member 121. Thus, the valve member 121 may be ruptured in a well-balanced manner.

Fourth Embodiment

A fourth embodiment of an electric storage device will now be described with reference to FIG. 11.

In the description hereafter, same reference numerals are given to those components that are the same as the components of the embodiments described above. Such components will not be described in detail.

Figure 11:
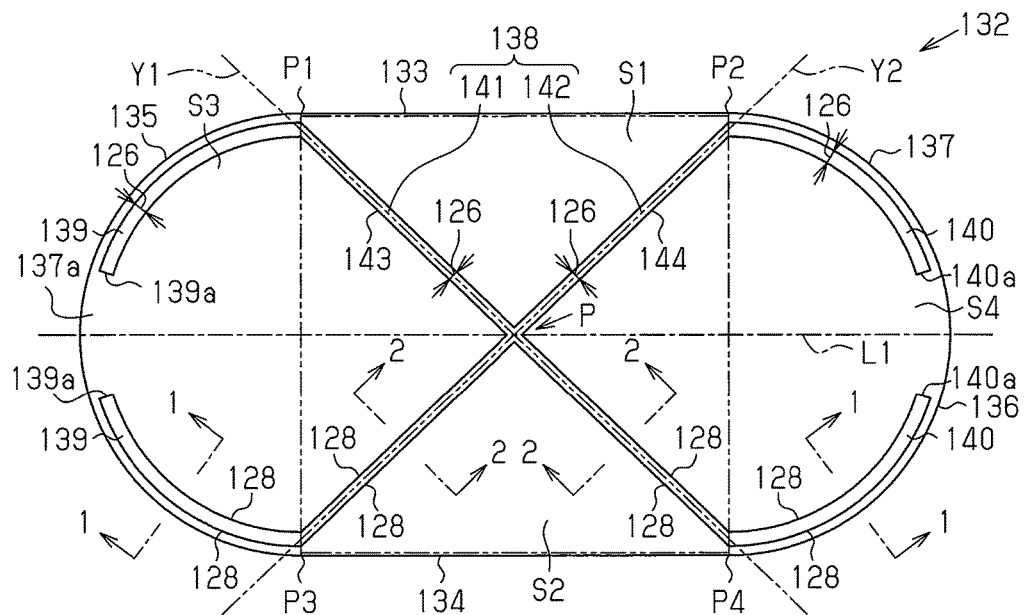
FIG. 11 is a plan view showing the outer surface of a pressure release valve according to a fourth embodiment of the present invention.

As shown in FIG. 11, a pressure release valve 132 of the present embodiment includes a track-shaped (oval) rim connecting two parallel straight portions 133 and 134 with arc portions 135 and 136. A valve member 137 of the pressure release valve 132 is connected to the rim of the pressure release valve 132 and track-shaped (oval) like the pressure release valve 132.

The arc portion 135 includes one end connected to one end of the straight portion 133 and another end connected to the one end of the straight portion 134. The arc portion 136 includes one end connected to the other end of the straight portion 133 and another end connected to the other end of the straight portion 134. Thus, in the present embodiment, one of the ends of each of the straight portions 133 and 134 is connected to the arc portion 135, which is entirely arcuate. The other end of each of the straight portions 133 and 134 is connected to the arc portion 136, which is entirely arcuate. In the pressure release valve 132, the portions where the ends of the straight portions 133 and 134 are connected to the ends of the arc portions 135 and 136 define interfaces P1, P2, P3, and P4 of the straight portions 133 and 134 and the arc portions 135 and 136.

The valve member 137 has an outer surface 137a including grooves. The grooves include an intersecting groove 138 and arcuate grooves 139 and 140, which extend along the arc portions 135 and 136. In the present embodiment, each of the intersecting groove 138 and the arcuate grooves 139 and 140 is a V-shaped groove.

The intersecting groove 138 includes two linear grooves 141 and 142. The linear grooves 141 and 142 are respectively located on hypothetical lines Y1 and Y2 that intersect the arc portions 135 and 136, which form the rim of the pressure release valve 132. The hypothetical lines Y1 and Y2 intersect a hypothetical line indicated in the drawing by a double-dashed line connecting the interfaces P1 and P3 and a hypothetical line indicated in the drawing by a double-dashed line connecting the interfaces P2 and P4. The intersecting groove 138 includes an intersection P at a location where the two linear grooves 141 and 142 intersect. In this embodiment, the intersection P of the intersecting groove 138 is located at the central part of the valve member 137.

Further, the outer surface 137a of the valve member 137 includes two arcuate grooves 139 extending along the arc portion 135 and two arcuate grooves 140 extending along the arc portion 136. One of the two arcuate grooves 139 is connected to one end of the linear groove 141, which is located in the vicinity of the interface P1, and extended in an arcuate manner along the arc portion 135. One of the two arcuate grooves 140 is connected to one end of the linear groove 142, which is located in the vicinity of the interface P2, and extended in an arcuate manner along the arc portion 136. The other one of the two arcuate grooves 139 is connected to the other end of the linear groove 142, which is located in the vicinity of the interface P3, and extended in an arcuate manner along the arc portion 135. The other one of the two arcuate grooves 140 is connected to the other end of the linear groove 141, which is located in the vicinity of the interface P4, and extended in an arcuate manner along the arc portion 136. Each of the arcuate grooves 139 and 140 has a length set so that the end at the opposite side of the end connected to the linear groove 141 or 142 is located at a position separated by a predetermined distance from a bisector L1. The bisector L1 is a straight line indicated by a single-dashed line in the drawing and bisects the valve member 137 in a direction perpendicular to the direction in which the straight portions 133 and 134 extend. That is, each of the arcuate grooves 139 and 140 is arranged along part of the arc portion 135 or 136.

In the present embodiment, the linear groove 141 shown in FIG. 11 ("D2" in FIG. 10B) and the arcuate grooves 139 and 140 ("D1" in FIG. 10A) shown in FIG. 11 that are connected to the linear groove 141 have the same depth 127. An angle 130 of the opening ends 128 at the two sides of the linear groove 141 relative to the deepest portion 129 of the linear groove 141 is smaller than an angle 130 of the opening ends 128 at the two sides of each of the arcuate grooves 139 and 140 relative to the deepest portion 129 of each of the arcuate grooves 139 and 140. Thus, in a rupture groove 143, which includes the linear groove 141 and the arcuate grooves 139 and 140, the angle 130 decreases in a range from the ends 139a and 140a of the arcuate grooves 139 and 140, which are located at the opposite side of the ends connected to the linear groove 141, to the intersection P. The decrease in the angle 130 reduces the opening width 126 of the rupture groove 143 from the end 139a toward the intersection P and from the end 140a toward the intersection P as shown in FIG. 11. In this embodiment, the angle 130 is varied in a stepped manner by changing the angle 130 of the linear groove 141 from the angle 130 of the arcuate grooves 139 and 140. Further, the angle 130 of the linear groove 141 is constant along the length of the linear groove 141, and the angle 130 of the arcuate grooves 139 and 140 is constant along the length of the arcuate grooves 139 and 140. The decrease in the angle 130 forms an angle varying portion in the grooves of the valve member 137.

The linear groove 142 has the same shape as the linear groove 141. The arcuate grooves 139 and 140, which are connected to the linear groove 142, have the same shape as the arcuate grooves 139 and 140, which are connected to the linear groove 141. Thus, a rupture groove 144, which includes the linear groove 142 and the arcuate grooves 139 and 140, has the same shape as the rupture groove 143. Further, the rupture groove 144 has an angle varying portion like the rupture groove 143. That is, in the rupture groove 144, the angle 130 decreases in a range from the ends 139a and 140a of the arcuate grooves 139 and 140, which are located at the opposite side of the ends connected to the linear groove 142, to the intersection P. This reduces the opening width 126 of the rupture groove 144 from the end 139a toward the intersection P and from the end 140a toward the intersection P as shown in FIG. 11. Further, the valve member 137 of the pressure release valve 132 includes a thin film portion 131 that is located between the bottom of each of the linear grooves 141 and 142 and the inner surface 137b of the valve member 137 and a thin film portion 131 that is located between the bottom of each of the arcuate grooves 139 and 140 and the inner surface 137b of the valve member 137.

When assuming that the hypothetical lines Y1 and Y2 extend along the intersecting groove 138, the outer surface 137a of the valve member 137 includes regions S1, S2, S3, and S4 surrounded by the hypothetical lines Y1 and Y2 and the rim of the pressure release valve 132. Region S1 is defined by a portion of the hypothetical line Y1 located between the intersection P and the intersection of the hypothetical line Y1 and the arc portion 135, a portion of the hypothetical line Y2 located between the intersection P and the intersection of the hypothetical line Y2 and the arc portion 136, and the straight portion 133. Region S2 is defined by a portion of the hypothetical line Y2 located between the intersection P and the intersection of the hypothetical line Y2 and the arc portion 135, a portion of the hypothetical line Y1 located between the intersection P and the intersection of the hypothetical line Y1 and the arc portion 136, and the straight portion 134. Region S1 and region S2 are symmetric with respect to the intersection P of the hypothetical line Y1 and the hypothetical line Y2.

Region S3 is defined by a portion of the hypothetical line Y1 located between the intersection P and the intersection of the hypothetical line Y1 and the arc portion 135, a portion of the hypothetical line Y2 located between the intersection P and the intersection of the hypothetical line Y2 and the arc portion 135, and the arc portion 135. Region S4 is defined by a portion of the hypothetical line Y2 located between the intersection P and the intersection of the hypothetical line Y2 and the arc portion 136, a portion of the hypothetical line Y1 located between the intersection P and the intersection of the hypothetical line Y1 and the arc portion 136, and the arc portion 136. Region S3 and region S4 are symmetric with respect to the intersection P of the hypothetical line Y1 and the hypothetical line Y2.

In the present embodiment, the regions S1 and S2 include the straight portions 133 and 134, entirely contact the straight portions 133 and 134, and slightly contact the arc portions 135 and 136. Further, in the present embodiment, the regions S3 and S4 include the arc portions 135 and 136 and substantially contact the entire arc portions 135 and 136. In the present embodiment, the regions S1 and S2 define a second region in which the section contacting the arc portions 135 and 136 is small, and the regions S3 and S4 define a first region in which the section contacting the arc portions 135 and 136 is large. The four regions S1 to S4 located in the outer surface 137a of the valve member 137 are set so that the regions S3 and S4, which have a large section contacting the arc portions 135 and 136, have a larger area than the regions S1 and S2, which have a small section contacting the arc portions 135 and 136.

The operation of the fourth embodiment will now be described.

In the present embodiment, the angle 130 (first angle) of the linear grooves 141 and 142, which form the intersecting groove 123, is smaller than the angle 130 (second angle) of the arcuate grooves 139 and 140. Thus, the angle 130 of the linear grooves 141 and 142 is more acute than the angle 130 of the arcuate grooves 139 and 140. Further, the linear grooves 141 and 142 include the intersection P. Thus, the pressure applied from the inner side of the case 11 is apt to concentrating at the intersection P, and rupturing of the valve member 121 is apt to starting from the intersection P. Accordingly, the intersection P serves as a rupture initiation point from where the valve member 137 starts to rupture. When the pressure of the case 11 reaches the release pressure, the valve member 137 ruptures from the intersection P.

Further, in the present embodiment, when rupturing starts from the intersection P and rupturing of the linear grooves 141 and 142 reaches the ends connected to the arcuate grooves 139 and 140, the arcuate grooves 139 and 140 start to rupture. The rupturing separates the valve member 137 into the four regions S1 to S4 along the grooves defining the regions S1 and S4.

In this embodiment, the area of the regions S3 and S4, in which the section contacting the arc portions 135 and 136 is large, is greater than the area of the regions S1 and S2, in which the section contacting the straight portions 133 and 134 is large. That is, the regions S3 and S4 have a larger pressure receiving area than the regions S1 and S2. Thus, the received amount of the pressure applied from the inner side of the case 11 to the inner surface 137b of the valve member 137 is greater in the regions S3 and S4 than in the regions S1 and S2.

Accordingly, in addition to the twelfth to sixteenth effects (advantages) of the third embodiment, the fourth embodiment has the effects described below. Here, the twelfth to sixteenth effects are to be understood by substituting "the pressure release valve 120" with "the pressure release valve 132," "the valve member 121" with "the valve member 137," and "the intersecting groove 123" with the "intersecting groove 138."

(17) The arcuate grooves 139 and 140 do not rupture as easily as the linear grooves 141 and 142. Thus, the area of the regions S3 and S4, in which the section contacting the arc portions 135 and 136 is large, is set to be greater than the area of the regions S1 and S2, in which the section contacting the straight portions 133 and 134 is large, so that the pressure receiving amount of the regions S3 and S4 increases. Accordingly, even when the pressure release valve 132 includes the arcuate grooves 139 and 140 along the arc portions 135 and 136 to enlarge the opening of the pressure release valve 132, the rupturing of the arcuate grooves 139 and 140 is facilitated so that the regions S3 and S4 are easily torn toward the outer side. As a result, the pressure release valve 132 opens in a well-balanced manner, and the opening of the pressure release valve 132 may be enlarged. This allows pressure to be quickly released from the case 11.

If the pressure receiving amount of the regions S3 and S4 contacting the arc portions 135 and 136 were to be small, the rupturing of the arcuate grooves 139 and 140 may be insufficient. That is, when the pressure release valve 132 opens in a poorly balanced manner, the arcuate grooves 139 and 140 would not rupture sufficiently. As a result, the opening of the pressure release valve 132 would be small. Accordingly, pressure may not be quickly released from the case 11.

(18) The intersecting groove 138 includes the two linear grooves 141 and 142. In the initial rupturing stage of the valve member 137, the linear grooves 141 and 142 facilitate rupturing. Thus, pressure may be released from the case 11 more quickly.

(19) The pressure release valve 132 is track-shaped (oval). Thus, a larger opening may be set for the pressure release valve 132 than when the pressure release valve 132 is tetragonal. Accordingly, pressure may be released from the case 11 more quickly.

(20) The linear grooves 141 and 142 are extended to the vicinities of the interfaces P1 to P4. Thus, the arcuate grooves 139 and 140 may be arranged along the arc portions 135 and 136. Accordingly, when the grooves of the valve member 137 rupture, the opening of the pressure release valve 132 may be enlarged.

(21) The arcuate grooves 139 and 140 are arranged along parts of the arc portions 135 and 136. Thus, even when the grooves rupture and tears the valve member 137 toward the outer side, the valve member 137 is connected at locations free from grooves. This prevents the scattering of fragments of the valve member 137.

(22) The linear grooves 141 and 142 are connected to the arcuate grooves 139 and 140. Thus, after the linear grooves 141 and 142 rupture, the rupturing of the linear grooves 141 and 142 may be readily shifted to the rupturing of the arcuate grooves 139 and 140. The rupturing of the linear grooves 141 and 142 separates the pressure release valve 132 into the regions S1 to S4 and tears the valve member 137 toward the outer side thereby forming an opening. This releases pressure from the opening out of the case 11. Thus, by readily shifting the rupturing from the linear grooves 141 and 142 to the arcuate grooves 139 and 140, a sufficient open amount may be ensured for the pressure release valve 132.

Fifth Embodiment

A fifth embodiment of an electric storage device will now be described with reference to FIG. 12.

Figure 12:
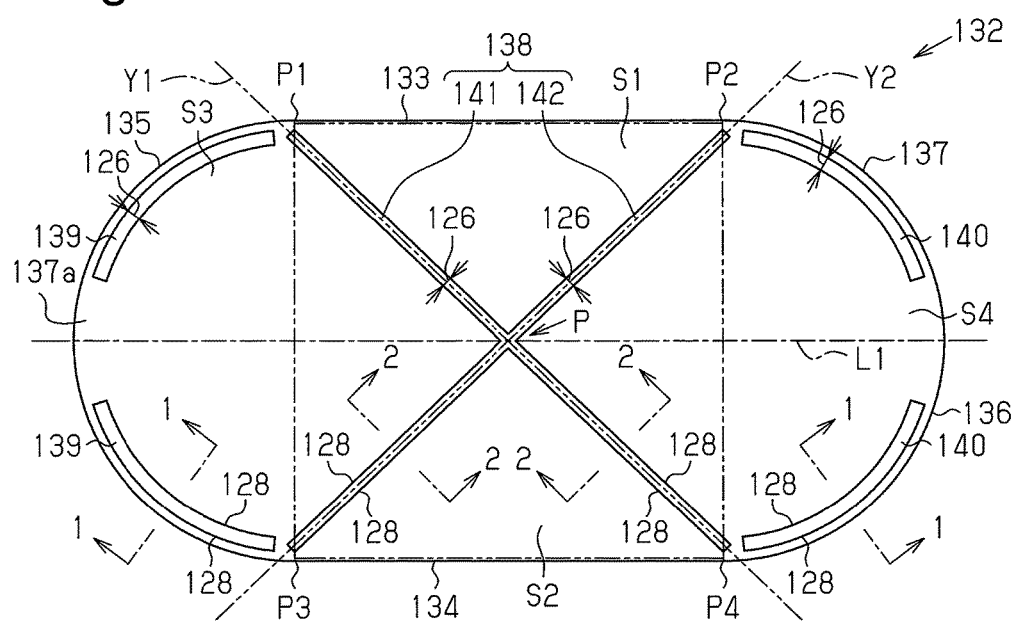
FIG. 12 is a plan view showing the outer surface of a pressure release valve according to a fifth embodiment of the present invention.

As shown in FIG. 12, in the fifth embodiment, the outer surface 137a of the valve member 137 in the pressure release valve 132 includes the intersecting groove 138, which is formed by the linear grooves 141 and 142, and the arcuate grooves 139 and 140, which extend along the arc portions 135 and 136, like in the fourth embodiment. In the fifth embodiment, the linear grooves 141 and 142 are not connected to the arcuate grooves 139 and 140.

As shown in FIGS. 10A and 10B, the angle 130 of the linear grooves 141 and 142 ("D2" in the drawing) is smaller than the angle 130 of the arcuate grooves 139 and 140 ("D1" in the drawing). As shown in FIG. 12, the opening width 126 of the linear grooves 141 and 142 is smaller than the opening width 126 of the arcuate grooves 139 and 140. Thus, in the same manner as the fourth embodiment, the intersection P of the intersecting groove 138 serves as a rupture initiation point from where the valve member 137 starts to rupture. Accordingly, in the present embodiment, the intersecting grooves 138 (linear grooves 141 and 142) serves as a first groove including the rupture initiation point, and the arcuate grooves 139 and 140 serves as a second groove that does not include the rupture initiation point.

In the outer surface 137a of the valve member 137, the intersecting groove 138 and the arcuate grooves 139 and 140 form regions S1, S2, S3, and S4 surrounded by the hypothetical lines Y1 and Y2 and the rim of the pressure release valve 132. The area of each of the four regions S1 to S4 in the outer surface 137a of the valve member 137 is set so that the area of the regions S3 and S4, in which the section contacting the arc portions 135 and 136 is large, is greater than the area of the regions S1 and S2, in which the section contacting the arc portions 135 and 136 is small.

The operation of the fifth embodiment will now be described.

In the present embodiment, the angle 130 of the linear grooves 141 and 142 is smaller than the angle 130 of the arcuate grooves 139 and 140. Thus, the pressure applied from the inner side of the case 11 is apt to concentrating at the intersection P, and rupturing of the valve member 121 is apt to starting from the intersection P.

Further, when rupturing starts from the intersection P and rupturing of the linear grooves 141 and 142 reaches the ends connected to the arcuate grooves 139 and 140, the arcuate grooves 139 and 140 start to rupture. The rupturing separates the valve member 137 into the four regions S1 to S4 along the grooves defining the regions S1 and S4. Thus, the received amount of the pressure applied from the inner side of the case 11 to the inner surface 137b of the valve member 137 is greater in the regions S3 and S4 than in the regions S1 and S2.

Accordingly, in addition to the twelfth to sixteenth effects (advantages) of the third embodiment and the seventeenth to twenty-first effects (advantages) of the fourth embodiment, the fifth embodiment has the effects described below.

(23) The intersecting groove 138 is not connected to the arcuate grooves 139 and 140. This ensures rupturing from the intersecting groove 138 that includes the intersection P.

Sixth Embodiment

A sixth embodiment of an electric storage device will now be described with reference to FIGS. 13 and 14.

Figure 13:
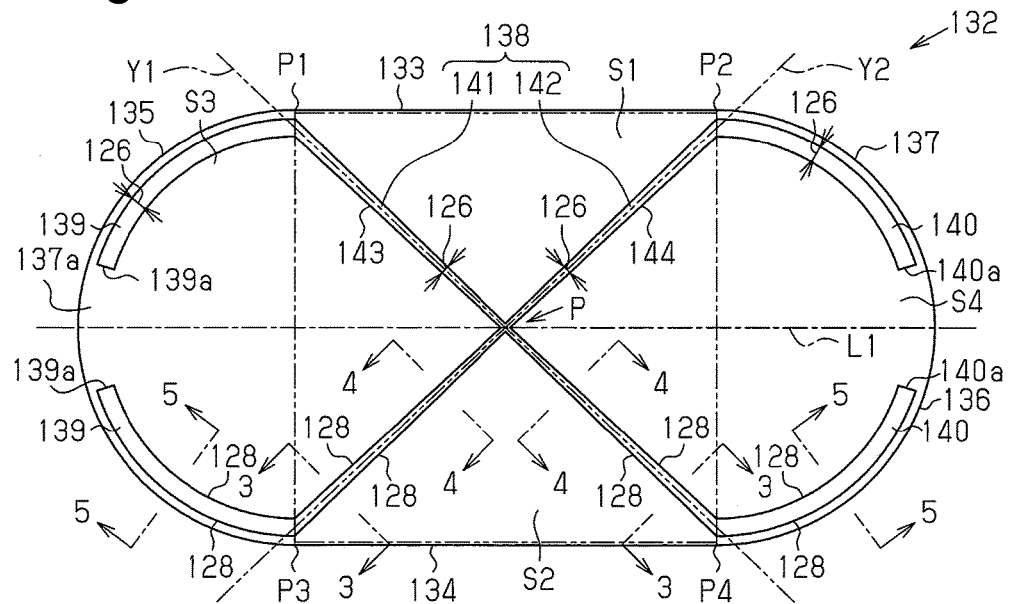
FIG. 13 is a plan view showing the outer surface of a pressure release valve according to a sixth embodiment of the present invention.

As shown in FIG. 13, in the present embodiment, the outer surface 137a of the valve member 137 in the pressure release valve 132 includes the intersecting groove 138, which is formed by the linear grooves 141 and 142, and the arcuate grooves 139 and 140, which extend along the arc portions 135 and 136, like in the fourth embodiment. In the present embodiment, the linear grooves 141 and 142 are connected to the arcuate grooves 139 and 140.

Figure 14A:
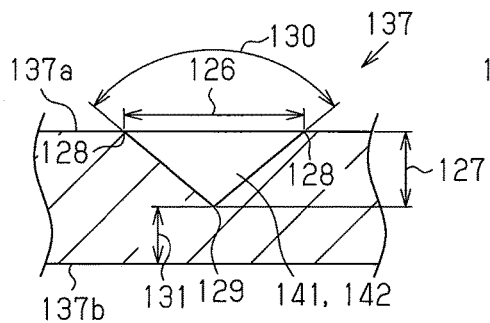
FIG. 14A is a cross-sectional view taken along line 3-3 in FIG. 13.
Figure 14B:
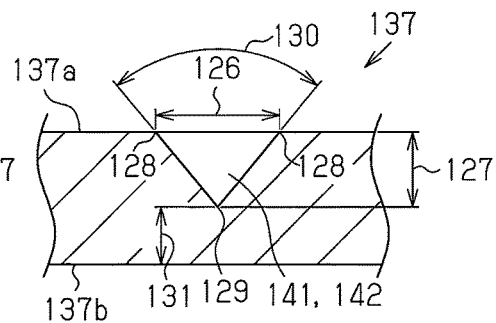
FIG. 14B is a cross-sectional view taken along line 4-4 in FIG. 13.

As shown in FIGS. 14A and 14B, the linear groove 141 has the same groove depth 127 in the direction the linear groove 141 extends. The angle 130 of the opening ends 128 at the two sides of the linear groove 141 relative to the deepest portion 129 of the linear groove 141 decreases in a range from the ends of the linear groove 141 that are connected to the arcuate grooves 139 and 140 to the intersection P. The decrease in the angle 130 reduces the opening width 126 of the linear groove 141 from the ends connected to the arcuate grooves 139 and 140 toward the intersection P as shown in FIG. 13.

Figure 14C:
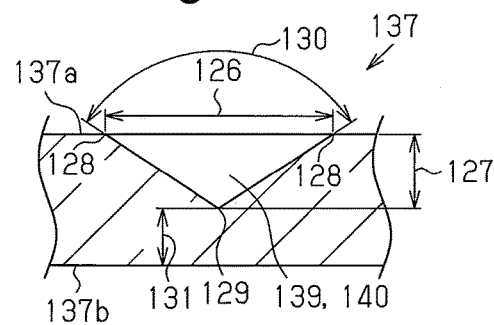
FIG. 14C is a cross-sectional view taken along line 5-5 in FIG. 13.

As shown in FIG. 14C, the arcuate grooves 139 and 140, which are connected to the linear groove 141, have the same groove depth 127 as the linear groove 141. The angle 130 of the opening ends 128 in the arcuate grooves 139 and 140 at the two sides of the arcuate grooves 139 and 140 relative to the deepest portion 129 of the arcuate grooves 139 and 140 is larger than the angle 130 of the linear groove 141 at the ends connected to the arcuate grooves 139 and 140. Thus, the opening width 126 of the arcuate grooves 139 and 140 is greater than the opening width 126 of the linear groove 141, as shown in FIG. 13.

In the rupture groove 143 including the linear groove 141 and the arcuate grooves 139 and 140, the angle 130 decreases from the ends 139a and 140a of the arcuate grooves 139 and 140, which are located at the opposite side of the ends connected to the linear groove 141, to the intersection. The decrease in the angle 130 reduces the opening width 126 from the end 139a toward the intersection P and reduces the opening width 126 from the end 140a toward the intersection P. In the present embodiment, the angle 130 is varied in a stepped manner between the linear groove 141 and the arcuate grooves 139 and 140 and continuously varied in the linear groove 141. The decrease in the angle 130 forms an angle varying portion in the grooves of the valve member 137.

The linear groove 142 has the same shape as the linear groove 141. The arcuate grooves 139 and 140, which are connected to the linear groove 142, have the same shape as the arcuate grooves 139 and 140, which are connected to the linear groove 141. Thus, a rupture groove 144, which includes the linear groove 142 and the arcuate grooves 139 and 140, has the same shape as the rupture groove 143. Further, the rupture groove 144 has an angle varying portion like the rupture groove 143. That is, in the rupture groove 144, the angle 130 decreases in a range from the ends 139a and 140a of the arcuate grooves 139 and 140, which are located at the opposite side of the ends connected to the linear groove 142, to the intersection P. This reduces the opening width 126 of the rupture groove 144 from the end 139a toward the intersection P and from the end 140a toward the intersection P as shown in FIG. 13. Further, the valve member 137 of the pressure release valve 132 includes a thin film portion 131 that is located between the bottom of each of the linear grooves 141 and 142 and the inner surface 137b of the valve member 137 and a thin film portion 131 that is located between the bottom of each of the arcuate grooves 139 and 140 and the inner surface 137b of the valve member 137.

In the outer surface 137a of the valve member 137, the intersecting groove 138 and the arcuate grooves 139 and 140 define regions S1, S2, S3, and S4 surrounded by the hypothetical lines Y1 and Y2 and the rim of the pressure release valve 132. The four regions S1 to S4 located in the outer surface 137a of the valve member 137 are set so that the regions S3 and S4, which include a large section contacting the arc portions 135 and 136, have a larger area than the regions S1 and S2, which include a small section contacting the arc portions 135 and 136.

The operation of the sixth embodiment will now be described.

In the present embodiment, the angle 130 is the smallest at the intersection P. Thus, the angle 130 of the linear grooves 141 and 142 at the intersection P is more acute than the angle of groove portions other than the intersection P. As a result, the pressure applied from the inner side of the case 11 is apt to concentrating at the intersection P, and rupturing of the valve member 137 easily starts from the intersection P. Accordingly, the intersection P serves as a rupture initiation point from where the valve member 137 starts to rupture.

When rupturing starts from the intersection P and the rupturing of the linear grooves 141 and 142 reaches the ends of the arcuate grooves 139 and 140, the arcuate grooves 139 and 140 also start to rupture. The rupturing separates the valve member 137 into the four regions S1 to S4 along the grooves defining the regions S1 to S4. The received amount of the pressure applied from the inner side of the case 11 to the inner surface 137b of the valve member 137 is greater in the regions S3 and S4 than in the regions S1 and S2.

Accordingly, in addition to the twelfth to sixteenth effects (advantages) of the third embodiment and the seventeenth to twenty-second effects (advantages) of the fourth embodiment, the sixth embodiment has the effect described below.

(24) The intersection P of the intersecting groove 123 may be set as the location where rupturing starts. Thus, rupturing easily starts from the intersection P. As a result, differences may be reduced in the opening shape and opening area of the pressure release valve 132.

The third to sixth embodiments may be modified as described below.

Figure 15:
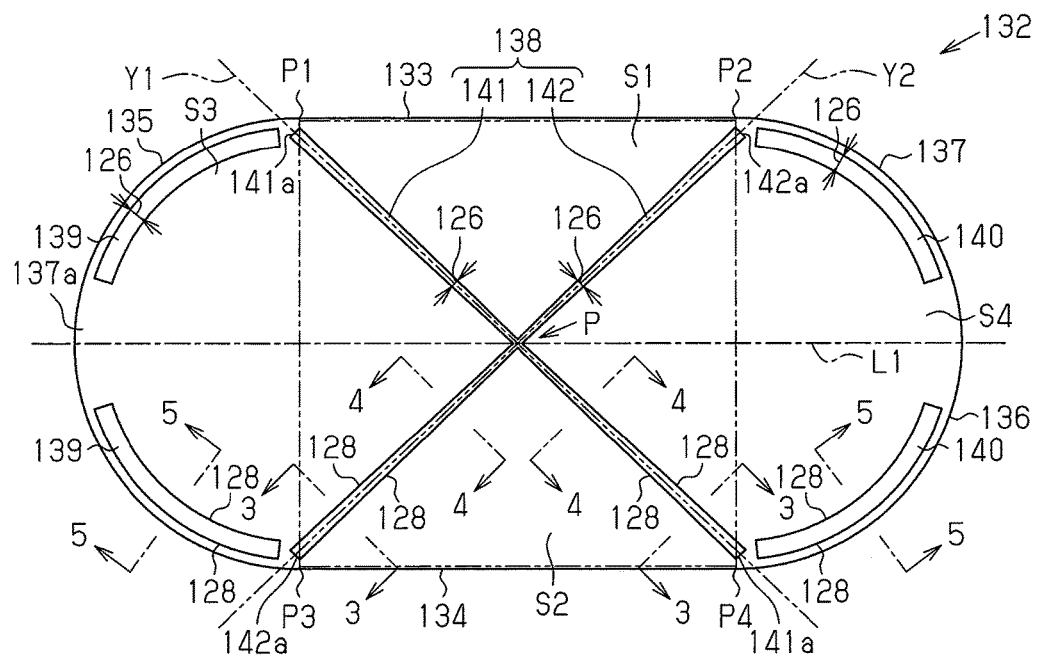
FIG. 15 is a plan view showing the outer surface of a pressure release valve in a further example.

FIG. 15 shows the valve member 137 of the pressure release valve 132 when the linear grooves 141 and 142 in the valve member 137 of the sixth embodiment shown in FIG. 13 are used as the linear grooves 141 and 142 in the valve member 137 of the fifth embodiment shown in FIG. 12. In this modified example, the angle 130 of the linear grooves 141 and 142 is decreased in the range from the ends 141a and 142a of the linear grooves 141 and 142, which are located at the opposite side of the intersection P, to the intersection P. The decrease in the angle 130 reduces the opening width 126 of the linear grooves 141 and 142 from the ends 141a and 142a of the linear grooves 141 and 142 toward the intersection P, as shown in FIG. 15. This structure has the same operation and effects as the fifth and sixth embodiments.

Instead of being X-shaped, the intersecting grooves 123 and 138 may be Y-shaped.

The cross-sectional shape of each groove may be changed.

The shape of the case 11 may be changed. For example, the case 11 may be cylindrical.

The pressure release valves 120 and 132 may be components separate from the case 11, and the pressure release valves 120 and 132 may be joined with the case 11. The joining is performed through, for example, welding (e.g., laser welding).

The electrode assembly 12 does not have to be of a stacked type and may be of a wound type in which strips of positive electrodes and strips of negative electrodes are stacked as layers.

The rechargeable battery 10 is not limited to a lithium ion battery and may be a different type of rechargeable battery. It is only necessary that ions be moved and charges be transferred between the positive electrode active layer and the negative electrode active layer. Further, the electric storage device may be a capacitor.

The rechargeable battery 10 may be installed as a vehicle power supply device in an automobile or in an industrial vehicle. Further, the rechargeable battery may be applied to a stationary electric storage device.

The grooves of the valve members 121 and 137 may be located in the inner surfaces 121b and 137b.

The shape of the grooves may be changed in the valve members 121 and 137. For example, the valve members 121 and 137 may include a groove that does not have an intersection, such as a single linear groove or a C-shaped groove. In the same manner as the above embodiments, in these grooves, the angle of the opening ends at the two sides of the groove relative to the deepest portion of the groove is set to form an angle varying portion in which the angle decreases from the end of the groove to the rupture initiation point.

In the third embodiment, the groove depth 127 of the intersecting groove 123 may be varied. In this case, the groove depth 127 is varied to increase toward the intersection portion P, which serves as the rupture initiation point. Further, in the fourth to sixth embodiments and the modified example of FIG. 15, the groove depth 127 of the intersecting groove 138 or the arcuate grooves 139 and 140 may be varied. In this case, the groove depth 127 of the intersecting groove 138 is varied to increase toward the intersection P, which serves as the rupture initiation point. Further, the groove depth 127 of the arcuate grooves 139 and 140 increases from the ends of the arcuate grooves 139 and 140 that are farther from the linear grooves 141 and 142 toward the end closer to the linear grooves 141 and 142. This obtains the operation and effects of the above embodiment. Further, this ensures that the intersection P is set as the location where rupturing starts.

In the fourth to sixth embodiments and the modified example of FIG. 15, the hypothetical lines Y1 and Y2 may each be set as a line extending through the central part of the opening width of a groove or a line that extends through the open end of the groove. In any case, the hypothetical lines Y1 and Y2 extend along grooves.

In the fourth to sixth embodiments and the modified example of FIG. 15, the positions where the hypothetical lines Y1 and Y2 intersect the arc portions 135 and 136 may be located farther from the interfaces P1 to P4 along the arc portions 135 and 136. The linear grooves 141 and 142 are arranged along the hypothetical lines Y1 and Y2. In this case, the hypothetical lines Y1 and Y2 intersect the rims of the arc portions 135 and 136. In this case, the regions S1 to S4 are set so that the area of the regions including large sections contacting the arc portions 135 and 136 is greater than the area of the regions including small sections contacting the arc portions 135 and 136. This also obtains the same effects as the above embodiment.

In the fourth to sixth embodiments and the modified example of FIG. 15, the linear grooves 141 and 142 do not necessarily have to be located on the hypothetical lines Y1 and Y2 that intersect the arc portions 135 and 136. The linear grooves 141 and 142 may be extended so that the ends of the linear grooves 141 and 142 are located at the side of the interfaces closer to the straight portions 133 and 134. In this case, the hypothetical lines Y1 and Y2 are extended along the linear grooves 141 and 142 and intersect the straight portions 133 and 134. This obtains the same effects as the above embodiments.

In the fourth to sixth embodiments and the modified example of FIG. 15, the shape of the pressure release valve 132 may be changed as long as it includes an arc portion. For example, the pressure release valve 132 may be elliptic or circular. Further, an arc portion may connect one of the ends of each of the straight portions 133 and 134, and a straight portion may connect the other ends. Further, an arc portion connecting one of the ends of each of the straight portions 133 and 134 may differ in shape from an arc portion connecting the other ends of the straight portions 133 and 134. This also obtains the same effects as the above embodiment.

In the fourth to sixth embodiments and the modified example of FIG. 15, the angle 130 of the intersecting groove 138 is small. This may mean that angle 130 of the entire intersecting groove 138 is smaller than the angle 130 of the arcuate grooves 139 and 140 or that the average angle 130 is smaller than the angle 130 of the arcuate grooves 139 and 140. This also obtains the same effects as the above embodiment.

In the sixth embodiment and the modified example of FIG. 15, the arcuate grooves 139 and 140 may also include angle varying portions. Thus, the angle of the arcuate grooves 139 and 140 may be varied continuously or in a stepped manner. In this case, the angle is increased in the arcuate grooves 139 and 140 from the ends closer to the linear grooves 141 and 142 to the ends closer to the linear grooves 141 and 142. This also obtains the same effects as the above embodiment.

Seventh Embodiment

A seventh embodiment of an electric storage device will now be described with reference to FIGS. 16 and 17.

In the description hereafter, same reference numerals are given to those components that are the same as the components of the embodiments described above. Such components will not be described in detail.

Figure 16:
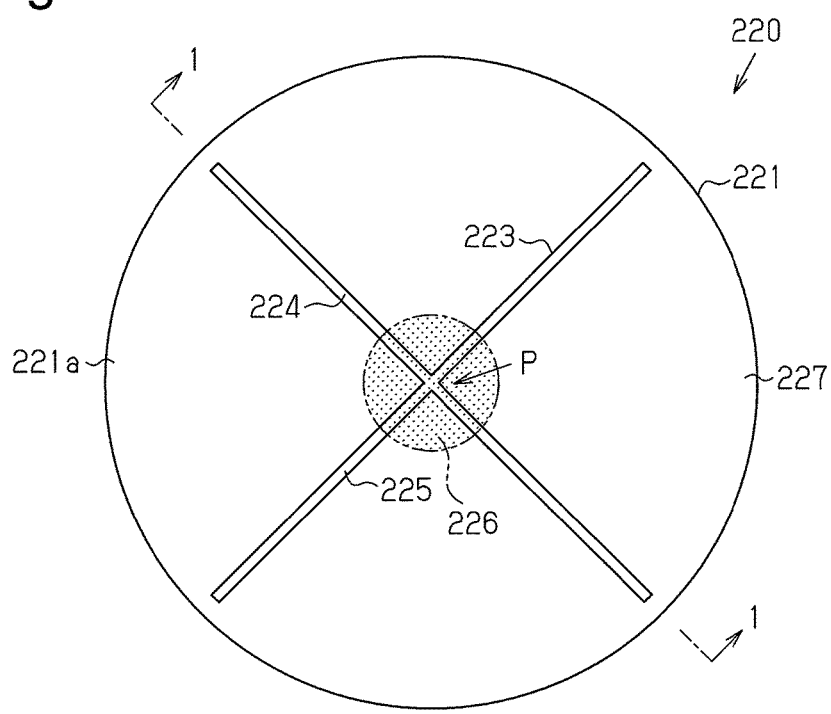
FIG. 16 is a plan view showing the outer surface of a pressure release valve according to a seventh embodiment of the present invention.

As shown in FIG. 16, a pressure release valve 220 includes a circular rim. A valve member 221 is connected to the rim of the pressure release valve 220. The valve member 221 is circular like the pressure release valve 220.

The valve member 221 has an outer surface 221a including an intersecting groove 223, which serves as a rupture groove. The intersecting groove 223 includes two linear grooves 224 and 225 that extend straight within the rim of the valve member 221. The linear grooves 224 and 225 are identical in shape and are V-shaped grooves in the present embodiment. The intersecting groove 223 includes an intersection at a location where the two linear grooves 224 and 225 intersect. Pressure applied from the inner side of the case 11 is apt to concentrating at the intersection P. The intersection P serves as a rupture initiation point where the valve member 221 starts to rupture. In the present embodiment, the intersection P of the intersecting groove 223 is located at the central part of the valve member 221.

Figure 17:
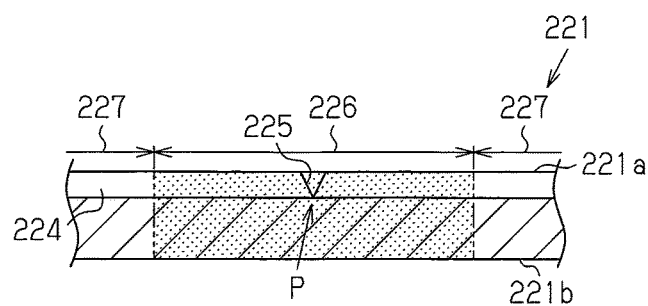
FIG. 17 is a cross-sectional view taken along line 1-1 in FIG. 16.

As shown in FIGS. 16 and 17, the valve member 221 includes a first rupture portion 226 and a second rupture portion 227. The first rupture portion 226 includes the intersection P and is located around the intersection P. The second rupture portion 227 surrounds the periphery of the first rupture portion 226 and is located between the periphery of the first rupture portion 226 and the rim of the valve member 221. In FIGS. 16 and 17, the first rupture portion 226 is shaded. The non-shaped portion is the second rupture portion 227. The second rupture portion 227 is a portion that does not include the intersection P, which serves as the rupture initiation point. The first rupture portion 226 and the second rupture portion 227 are portions including the groove surfaces of the linear grooves 224 and 225 as shown in FIG. 17.

As shown in FIG. 16, in a plan view of the outer surface 221a of the valve member 221, the area of the first rupture portion 226 is smaller than the area of the second rupture portion 227. Thus, in a plan view of the valve member 221, the first rupture portion 226 is a region smaller than the second rupture portion 227 and is located in a portion of the valve member 221 that includes the intersection P. Preferably, the area of the first rupture portion 226 is, for example, less than or equal to 50% of the area of the valve member 221.

In the present embodiment, the first rupture portion 226 is annealed. Due to the annealing, the mechanical strength of the first rupture portion 226 is lower than the mechanical strength of the second rupture portion 227. That is, the first rupture portion 226 is where a metal portion of the valve member 221 is softened when annealed. Annealing includes high-frequency annealing and laser annealing. In this specification, the mechanical strength relies on the material and not the shape.

The operation of the seventh embodiment will now be described.

In the present embodiment, the first rupture portion 226, which is softer than the second rupture portion 227, surrounds the intersection P of the intersecting groove 223 that serves as the rupture initiation point. Thus, the pressure applied from the inner side of the case 11 (refer to FIG. 1) is apt to concentrating at the intersecting groove 223 near the intersection P in the first rupture portion 226, and the valve member 221 easily starts to rupture from the intersection P.

When the pressure of the case 11 reaches the release pressure, the intersecting groove 223 ruptures from the intersection P. In this manner, when the intersecting groove 223, which is located in the outer surface 221a of the valve member 221 ruptures, the valve member 221 is separated into a number of regions and torn toward the outer side. This forms a large opening in the pressure release valve 220. The pressure of the case 11 is released out of the case 11 through the opening formed in the pressure release valve 220.

Accordingly, the seventh embodiment has the effects (advantages) described below.

(25) The valve member 221 includes the first rupture portion 226, which includes the intersection P and is softer than the second rupture portion 227. This sets the intersection P as the location where rupturing starts. As a result, differences may be reduced in the opening shape and the opening area of the pressure release valve 20. Accordingly, pressure may be sufficiently released from the case 11.

(26) The first rupture portion 226 and the second rupture portion 227 each include the intersecting groove 223. This facilitates the rupturing of the first rupture portion 226 and the second rupture portion 227 and allows pressure to be quickly released from the case 11.

(27) The valve member 221 includes the intersecting groove 223. Thus, in the initial rupturing stage, the intersecting groove radially enlarges the rupture. This allows pressure to be quickly released from the case 11.

(28) Annealing is performed to form the first rupture portion 226 in the valve member 221. Thus, a simple process may be used to provide the valve member with portions that differ in hardness.

Eight Embodiment

An eighth embodiment of an electric storage device will now be described with reference to FIGS. 16 and 17.

In the description hereafter, same reference numerals are given to those components that are the same as the components of the embodiments described above. Such components will not be described in detail.

Figure 18:
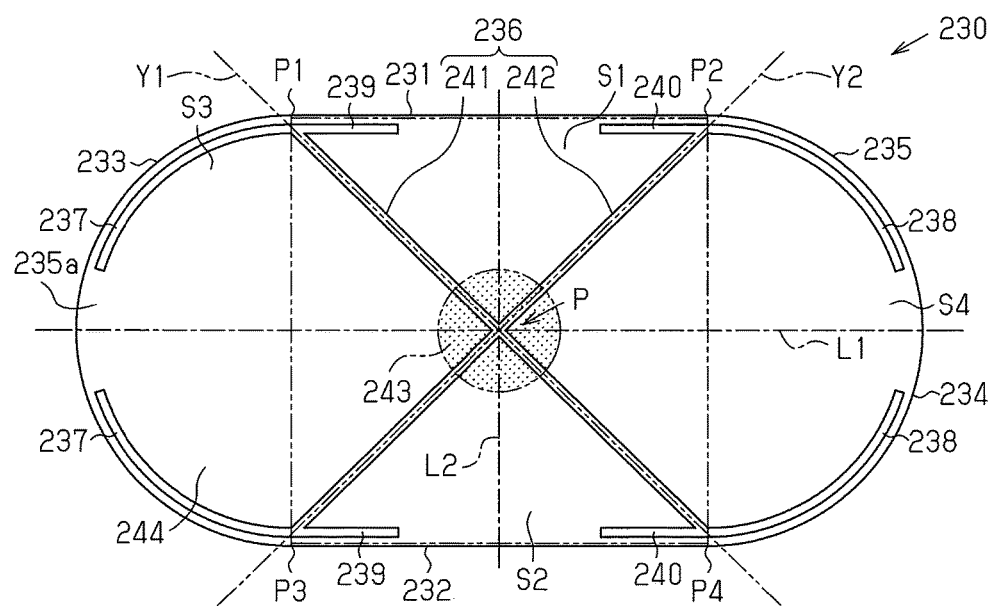
FIG. 18 is a plan view showing the outer surface of a pressure release valve according to an eighth embodiment of the present invention.

As shown in FIG. 18, in the present embodiment, a pressure release valve 230 includes a track-shaped (oval) rim that connects two parallel straight portions 231 and 232 with arc portions 233 and 234. The pressure release valve 230 includes a valve member 235 connected to the rim of the pressure release valve 230 and track-shaped (oval) like the pressure release valve 230.

The arc portion 233 includes one end that is connected to one of the ends of the straight portion 231 and another end that is connected to one of the ends of the arc portion 232. The arc portion 234 includes one end that is connected to the other end of the straight portion 231 and another end that is connected to the other end of the arc portion 232. Thus, in the present embodiment, one of the ends of each of the straight portions 231 and 232 is connected to the arc portion 233, which is entirely arcuate. The other end of each of the straight portions 231 and 232 is connected to the arc portion 234, which is entirely arcuate. In the pressure release valve 230, the portions where the ends of the straight portions 231 and 232 are connected to the ends of the arc portions 233 and 234 define interfaces P1, P2, P3, and P4 of the straight portions 231 and 232 and the arc portions 233 and 234.

The valve member 235 has an outer surface 235a including a rupture groove. The rupture groove includes an intersecting groove 236, arcuate grooves 237 and 238, which extend along the arc portions 233 and 234, and straight grooves 239 and 240, which extend along the straight portions 231 and 232. In the present embodiment, the intersecting groove 236, the arcuate grooves 237 and 238, and the straight grooves 239 and 240 are each V-shaped grooves.

The intersecting groove 236 includes two linear grooves 241 and 242. The linear grooves 241 and 242 lie along hypothetical lines Y1 and Y2 that intersect the arc portions 233 and 234, which form the rim of the pressure release valve 230. Further, the hypothetical lines Y1 and Y2 intersect a hypothetical line connecting the interfaces P1 and P3 and indicated by a double-dashed line in the drawing and intersect a hypothetical line connecting the interfaces P2 and P4 and indicated by a double-dashed line in the drawing. The intersecting groove 236 includes an intersection P at a location where the two linear grooves 241 and 242 intersect. In the present embodiment, the intersection P of the intersecting groove 236 is located at the central part of the valve member 235.

Further, the outer surface 235a of the valve member 235 includes two arcuate grooves 237 extending along the arc portion 233 and two arcuate grooves 238 extending along the arc portion 234. One of the two arcuate grooves 237 is connected to the end of the linear groove 241 located in the vicinity of the interface P1 and extended in an arcuate manner along the arc portion 233. Further, one of the two arcuate grooves 238 is connected to one of the ends of the linear groove 242 located in the vicinity of the interface P2 and extended in an arcuate manner along the arc portion 234. The other one of the two arcuate grooves 237 is connected to the other one of the ends of the linear groove 242 located in the vicinity of the interface P3 and extended in an arcuate manner along the arc portion 233. Further, the other one of the two arcuate grooves 238 is connected to the other one of the ends of the linear groove 241 located in the vicinity of the interface P4 and extended in an arcuate manner along the arc portion 234. Each of the arcuate grooves 237 and 238 has a length set so that the end at the opposite side of the end connected to the linear groove 241 or 242 is located at a position separated by a predetermined distance from a bisector L1. The bisector L1 is a straight line indicated by a single-dashed line in the drawing and bisects the valve member 235 in a direction perpendicular to the direction in which the straight portions 231 and 232 extend. That is, each of the arcuate grooves 237 and 238 is arranged along part of the arc portion 233 or 234.

Further, the outer surface 235*a* of the valve member 235 includes two straight grooves 239 and 240, which extend along the straight portion 231, and two straight grooves 239 and 240, which extend along the straight portion 232. One of the two straight grooves 239 is connected to one of the ends of the linear groove 241 located in the vicinity of the interface P1 and extended along the straight portion 231 in a linear manner. Further, one of the two straight grooves 240 is connected to one of the ends of the linear groove 242 located in the vicinity of the interface P2 and extended along the straight portion 231 in a linear manner. The other one of the two straight grooves 239 is connected to the other end of the linear groove 242 located in the vicinity of the interface P3 and extended along the straight portion 232 in a linear manner. Further, the other one of the two straight grooves 240 is connected to the other end of the linear groove 241 located in the vicinity of the interface P4 and extended along the straight portion 232 in a linear manner.

Each of the straight grooves 239 and 240 has a length set so that the end at the opposite side of the end connected to the linear groove 241 or 242 is located at a position separated by a predetermined distance from normal L2. The normal L2 is a straight line extending perpendicular to the bisector L1 and through the intersection P. That is, each of the straight grooves 239 and 240 extends along part of the straight portion 231 or 232. Thus, in the valve member 235, one of each of the straight grooves 239 and 240 is connected to the linear groove 241, and one of each of the straight grooves 239 and 240 is connected to the linear groove 242.

When assuming that the hypothetical lines Y1 and Y2 extend along the intersecting groove 236, the outer surface 235*a* of the valve member 235 includes regions S1, S2, S3, and S4 surrounded by the hypothetical lines Y1 and Y2 and the rim of the pressure release valve 230. Region S1 is defined by a portion of the hypothetical line Y1 located between the intersection P of the intersecting groove 236 and the intersection of the hypothetical line Y1 and the arc portion 233, a portion of the hypothetical line Y2 located between the intersection P and the intersection of the hypothetical line Y2 and the arc portion 234, and the straight portion 231. Region S2 is defined by a portion of the hypothetical line Y2 located between the intersection P and the intersection of the hypothetical line Y2 and the arc portion 233, a portion of the hypothetical line Y1 located between the intersection P and the intersection of the hypothetical line Y1 and the arc portion 234, and the straight portion 232. Region S1 and region S2 are symmetric with respect to the intersection of the hypothetical line Y1 and the hypothetical line Y2.

Region S3 is defined by a portion of the hypothetical line Y1 located between the intersection P and the intersection of the hypothetical line Y1 and the arc portion 233, a portion of the hypothetical line Y2 located between the intersection P and the intersection of the hypothetical line Y2 and the arc portion 233, and the arc portion 233. Region S4 is defined by a portion of the hypothetical line Y2 located between the intersection P and the intersection of the hypothetical line Y2 and the arc portion 234, a portion of the hypothetical line Y1 located between the intersection P and the intersection of the hypothetical line Y1 and the arc portion 234, and the arc portion 234. Region S3 and region S4 are symmetric with respect to the intersection of the hypothetical line Y1 and the hypothetical line Y2.

In the present embodiment, the regions S1 and S2 include the straight portions 231 and 232, entirely contact the straight portions 231 and 232, and slightly contact the arc portions 233 and 234. Further, in the present embodiment, the regions S3 and S4 include the arc portions 233 and 234 and substantially contact the entire arc portions 233 and 234. In the present embodiment, the regions S1 and S2 define a second region in which the section contacting the arc portions 233 and 234 is small, and the regions S3 and S4 define a first region in which the section contacting the arc portions 233 and 234 is large. The four regions S1 to S4 located in the outer surface 235*a* of the valve member 235 are set so that the regions S3 and S4, which have a large section contacting the arc portions 233 and 234, have a larger area than the regions S1 and S2, which have a small section contacting the arc portions 233 and 234.

As shown in FIG. 18, the valve member 235 of the present embodiment includes a first rupture portion 243 and a second rupture portion 244. The first rupture portion 243 includes the intersection P and is located around the intersection P. The second rupture portion 244 surrounds the periphery of the first rupture portion 243 and is located between the periphery of the first rupture portion 243 and the rim of the valve member 235. In FIG. 18, the first rupture portion 243 is shaded. The non-shaped portion is the second rupture portion 244. The first rupture portion 243 includes a portion of each of the regions S1 to S4 and lies across the regions S1 to S4. The second rupture portion 244 is a portion that includes groove surfaces of the portions of the linear grooves 241 and 242 excluded from the first rupture portion 243, the groove surfaces of the arcuate grooves 237 and 238, and the groove surfaces of the linear grooves 241 and 242. Further, the second rupture portion 227 does not include the intersection P, which serves as the rupture initiation point.

As shown in FIG. 18, in a plan view of the outer surface 235*a* of the valve member 235, the area of the first rupture portion 243 is smaller than the area of the second rupture portion 244. Thus, in a plan view of the valve member 235, the first rupture portion 243 is a region smaller than the second rupture portion 244 and is located in a portion of the valve member 235 that includes the intersection P. Preferably, the area of the first rupture portion 243 is, for example, less than or equal to 50% of the area of the valve member 235.

In the present embodiment, the first rupture portion 243 is annealed in the same manner as the first rupture portion 226 of the first embodiment. Due to the annealing, the mechanical strength of the first rupture portion 243 is lower than the mechanical strength of the second rupture portion 244. That is, the first rupture portion 243 is softer than the second rupture portion 244.

The operation of the eighth embodiment will now be described.

In the present embodiment, the first rupture portion 243, which is softer than the second rupture portion 244, surrounds the intersection P of the intersecting groove 236 that serves as the rupture initiation point. Thus, the pressure applied from the inner side of the case 11 (refer to FIG. 1) is apt to concentrating at the intersecting groove 236 near the intersection P in the first rupture portion 243, and the valve member 235 easily starts to rupture from the intersection P.

Further, in the present embodiment, when rupturing starts from the intersection P and the rupturing of the linear grooves 241 and 242 reaches the ends connected to the arcuate grooves 237 and 238, rupturing starts at the arcuate grooves 237 and 238 and also at the straight grooves 239 and 240. The rupturing separates the valve member 235 into the four regions S1 to S4 along the grooves defining the regions S1 to S4.

In this embodiment, the area of the regions S3 and S4, in which the section contacting the arc portions 233 and 234 is large, is greater than the area of the regions S1 and S2, in which the section contacting the straight portions 231 and 232 is large. That is, the regions S3 and S4 have a larger pressure receiving area than the regions S1 and S2. Thus, the received amount of the pressure applied from the inner side of the case 11 to the inner surface of the valve member 235 is greater in the regions S3 and S4 than in the regions S1 and S2.

Accordingly, in addition to the twenty-fifth to twenty-eighth effects (advantages) of the seventh embodiment, the eighth embodiment has the effects described below. Here, the twenty-fifth to twenty-eighth effects are to be understood by substituting "the valve member 221" with "the valve member 235," "the intersecting groove 223" with the "intersecting groove 236," "the first rupture portion 226" with "the first rupture portion 243," and "the second rupture portion 227" with "the second rupture portion 244."

(29) The arcuate grooves 237 and 238 do not rupture as easily as the linear grooves 241 and 242. Thus, the area of the regions S3 and S4, in which the section contacting the arc portions 233 and 234 is large, is set to be greater than the area of the regions S1 and S2, in which the section contacting the arc portions 233 and 234 is small, so that the pressure receiving amount of the regions S3 and S4 increases. Accordingly, even when the pressure release valve 230 includes the arcuate grooves 237 and 238 along the arc portions 233 and 234 to enlarge the opening of the pressure release valve 230, the rupturing of the arcuate grooves 237 and 238 is facilitated so that the regions S3 and S4 are easily torn toward the outer side. As a result, the pressure release valve 230 opens in a well-balanced manner, and the opening of the pressure release valve 230 may be enlarged. This allows pressure to be quickly released from the case 11.

If the pressure receiving amount of the regions S3 and S4 contacting the arc portions 233 and 234 were to be small, the rupturing of the arcuate grooves 237 and 238 may be insufficient. That is, when the pressure release valve 230 opens in a poorly balanced manner, the arcuate grooves 237 and 238 would not rupture sufficiently. As a result, the opening of the pressure release valve 230 would be small. Accordingly, pressure may not be quickly released from the case 11.

(30) The intersecting groove 236 includes the two linear grooves 241 and 242. Thus, in the initial rupturing stage of the valve member 235, the linear grooves 241 and 242 facilitate rupturing. Accordingly, pressure may be released from the case 11 more quickly.

(31) The pressure release valve 230 is track-shaped (oval). Thus, a larger opening may be set for the pressure release valve 230 than when the pressure release valve 230 is tetragonal. Accordingly, pressure may be released from the case 11 more quickly.

(32) The linear grooves 241 and 242 are extended to the vicinities of the interfaces P1 to P4. Thus, the arcuate grooves 237 and 238 may be arranged along the arc portions 233 and 234. Accordingly, when the grooves of the valve member 235 rupture, the opening of the pressure release valve 230 may be enlarged.

(33) The linear grooves 241 and 242 are connected to the arcuate grooves 237 and 238. Thus, after the linear grooves 241 and 242 rupture, the rupturing of the linear grooves 241 and 242 may be readily shifted to the rupturing of the arcuate grooves 237 and 238. The rupturing of the linear grooves 241 and 242 of the pressure release valve 230 separates the pressure release valve 230 into the regions S1 to S4 and tears the valve member 235 toward the outer side thereby forming an opening. This releases pressure from the opening out of the case 11. Thus, by readily shifting the rupturing from the linear grooves 241 and 242 to the arcuate grooves 237 and 238, a sufficient open amount may be ensured for the pressure release valve 230.

(34) The straight grooves 239 and 240 facilitate the tearing of the regions S1 and S2 toward the outer side. That is, the rupturing of the straight grooves 239 and 240 allows the regions S1 and S2 to easily open toward the outer side. This opens the pressure release valve 230 in a well-balanced manner and allows the opening of the pressure release valve 230 to be enlarged. That is, pressure may be quickly released from the case 11.

(35) The arcuate grooves 237 and 238 are arranged along parts of the arc portions 233 and 234. Further, the straight grooves 239 and 240 are arranged along parts of the straight portions 231 and 232. Thus, even when the grooves rupture and tears the valve member 37 toward the outer side, the valve member 235 is connected at locations free from grooves. This prevents the scattering of fragments of the valve member 235.

The seventh and eighth embodiments may be modified as described below.

Instead of annealing the first rupture portions 226 and 243, the second rupture portions 227 and 244 may undergo shot-peening. Shot-peening hardens the metal portions of the valve members 221 and 235. Thus, the shot-peened second rupture portions 227 and 244 are harder than the non-shot-peened first rupture portions 226 and 243. That is, the first rupture portions 226 and 243, which have a lower mechanical strength than the second rupture portions 227 and 244, are soft. Accordingly, the same effects as the seventh and eighth embodiments may be obtained.

In addition to annealing the first rupture portions 226 and 243, the second rupture portions 227 and 244 may undergo shot-peening. In this case, the annealing softens the first rupture portions 226 and 243, and the shot-peening hardens the second rupture portions 227 and 244. Thus, the first rupture portions 226 and 243 are softer than the second rupture portions 227 and 244. Accordingly, the same effects as the seventh and eighth embodiments may be obtained.

An annealing process or a shot-peening process may be performed on both inner and outer surfaces of the valve members 221 and 235.

Instead of being X-shaped, the intersecting grooves 223 and 236 may be Y-shaped.

The cross-sectional shape of each rupture groove may be changed.

The shape of the case 11 may be changed. For example, the case 11 may be cylindrical.

The pressure release valves 220 and 230 may be components separate from the case 11, and the pressure release valves 220 and 230 may be joined with the case 11. The joining is performed through, for example, welding (e.g., laser welding).

The electrode assembly 12 does not have to be of a stacked type and may be of a wound type in which strips of positive electrodes and strips of negative electrodes are stacked as layers.

The rechargeable battery 10 is not limited to a lithium ion battery and may be a different type of rechargeable battery. It is only necessary that ions be moved and charges be transferred between the positive electrode active layer and the negative electrode active layer. Further, the electric storage device may be a capacitor.

The rechargeable battery 10 may be installed as a vehicle power supply device in an automobile or in an industrial vehicle. Further, the rechargeable battery may be applied to a stationary electric storage device.

The inner and outer surfaces of the valve members 221 and 235 may include the first rupture portions 226 and 243 and the second rupture portions 227 and 244 and omit the rupture grooves. In this structure, the first rupture portions 226 and 243 are set at locations where rupturing starts, and rupturing is apt to starting from the first rupture portions 226 and 243.

Rupture grooves may be arranged in the inner surface of the valve members 221 and 235.

The shape of the rupture grooves may be changed in the valve members 221 and 235. For example, the valve members 221 and 235 may include a groove that does not have an intersection, such as a single linear groove or a C-shaped groove. The shape of the rupture grooves may be changed in the valve members 221 and 235. For example, the valve members 221 and 235 may include a groove that does not have an intersection, such as a single linear groove or a C-shaped groove. In the valve members 221 and 235 including these grooves, the regions including the locations set as rupture initiation points are defined as the first rupture portions 226 and 243, and the regions free from the locations set as the rupture initiation points are set as the second rupture portions 227 and 244. In this case, annealing may be performed to form the first rupture portions 226 and 243, and shot-peening may be performed to form the second rupture portions 227 and 244.

In the eighth embodiment, the hypothetical lines Y1 and Y2 may each be set as a line extending through the central part of the opening width of a groove or a line that extends through the open end of the groove. In any case, the hypothetical lines Y1 and Y2 extend along grooves.

In the eighth embodiment, the positions where the hypothetical lines Y1 and Y2 intersect the arc portions 233 and 234 may be located farther from the interfaces P1 to P4 along the arc portions 233 and 234. The linear grooves 241 and 242 are arranged along the hypothetical lines Y1 and Y2. In this case, the hypothetical lines Y1 and Y2 intersect the rims of the arc portions 233 and 234. In this case, the regions S1 to S4 are set so that the area of the regions including large sections contacting the arc portions 233 and 234 is greater than the area of the regions including small sections contacting the arc portions 233 and 234. This also obtains the same effects as the above embodiment.

In the eighth embodiment, the linear grooves 241 and 242 do not necessarily have to be located on the hypothetical lines Y1 and Y2 that intersect the arc portions 233 and 234. The linear grooves 241 and 242 may be extended so that the ends of the linear grooves 241 and 242 are located at the side of the interfaces closer to the straight portions 231 and 232. In this case, the hypothetical lines Y1 and Y2 are extended along the linear grooves 241 and 242 and intersect the straight portions 231 and 232. This obtains the same effects as the above embodiments.

In the eighth embodiment, the shape of the pressure release valve 230 may be changed as long as it includes an arc portion. For example, the pressure release valve 230 may be elliptic or circular. Further, an arc portion may connect one of the ends of each of the straight portions 231 and 232, and a straight portion may connect the other ends. Moreover, an arc portion connecting one of the ends of each of the straight portions 231 and 232 may differ in shape from an arc portion connecting the other ends of the straight portions 231 and 232. This also obtains the same effects as the above embodiment.

In the eighth embodiment, the arcuate grooves 237 and 238 and the straight grooves 239 and 240 do not have to be connected to the linear grooves 241 and 242. This also obtains the same effects as the above embodiment.

In the eighth embodiment, the intersecting groove 236 and the arcuate grooves 237 and 238 may serve as the rupture groove of the valve member 235, and the straight grooves 239 and 240 may be omitted. In this case, the intersecting groove 236 and the arcuate grooves 237 and 238 may be connected like in the above embodiment or disconnected like in the above modified example. In this case, the same advantages as the above embodiment may be obtained.

Technical concepts that can be acknowledged from the above embodiments as modified examples are listed below.

(a) The depth of the groove increases at a constant rate toward the rupture initiation point.

(b) The pressure release valve includes an arc portion, and the arc portion is part of the rim of the pressure release valve. The first groove is an intersecting groove. The second groove is one of arcuate grooves extending along the arc portion and connected to an end of the intersecting groove. The pressure release valve includes a first region and a second region. When assuming that a hypothetical line is formed by a line extending along the intersecting groove and intersecting the rim of the pressure release valve, the first region is a region surrounded by the hypothetical line and the rim of the pressure release valve and includes a large section contacting the arc portion, and the second region is a region surrounded by the hypothetical line and the rim of the pressure release valve and includes a small section contacting the arc portion.

(c) The pressure release valve includes an arc portion, and the arc portion is part of the rim of the pressure release valve. The pressure release valve includes a rupture groove having a rupture initiation point. The rupture groove includes an intersecting groove and an arcuate groove, which extends along the arc portion and is connected to an end of the intersecting groove. The pressure release valve includes a first region and a second region. When assuming that a hypothetical line is formed by a line extending along the intersecting groove and intersecting the rim of the pressure release valve, the first region is a region surrounded by the hypothetical line and the rim of the pressure release valve and includes a large section contacting the arc portion, and the second region is a region surrounded by the hypothetical line and the rim of the pressure release valve and includes a small section contacting the arc portion. The first region has a larger area than the second region.

(d) The rim of the pressure release valve is track-shaped and includes parallel straight portions and the arc portion that connects the straight portions.

DESCRIPTION OF REFERENCE CHARACTERS 10) rechargeable battery, 11) case, 12) electrode assembly, 20 and 32) pressure release valve, 21 and 37) valve member, 21a and 37a) outer surface, 23) intersecting groove, 24 and 25) linear groove, 26 and 47) recess groove, 27 and 28) opening width, 33 and 34) straight portion, 35 and 36) arc portion, 38 and 39) arcuate groove, 45) groove, P) intersection, S1 to S4) region, X) central position, Y1 and Y2) hypothetical line, 120 and 132) pressure release valve, 121 and 137) valve member, 121a and 137a) outer surface, 123 and 138) intersecting groove, 124a, 125a, 139a, 140a, 141a, and 142a) end, 128) open end, 129) deepest portion, 130) angle, P) intersection, 220 and 23a) pressure release valve, 221 and 235) valve body, 221a and 235a) outer surface, 223 and 236) intersecting groove, 226 and 243) first rupture portion, 227 and 244) second rupture portion, P) intersection.

The invention claimed is:

1. An electric storage device comprising:
an electrode assembly;
a case that accommodates the electrode assembly; and
a pressure release valve that releases pressure out of the case, wherein:
the pressure release valve includes an arc portion, wherein the arc portion is part of a rim of the pressure release valve;
the pressure release valve includes an intersecting groove, which includes a center;
a portion of the intersecting groove near the center has a larger opening width than a portion of the intersecting groove at the opposite side of the center;
the intersecting groove includes arcuate grooves, which extend along the arc portions and are connected to ends of the intersecting groove;
the pressure release valve includes a first region and a second region; and
when assuming that a hypothetical line is formed by a straight line extending along the intersecting groove and intersecting the rim of the pressure release valve,
the first region is a region surrounded by the hypothetical line and the rim of the pressure release valve and is a region including a large section contacting the arc portion,
the second region is a region surrounded by the hypothetical line and the rim of the pressure release valve and is a region including a small section that contacts the arc portion, and
the first region has a larger area than the second region.

2. An electric storage device comprising:
an electrode assembly;
a case that accommodates the electrode assembly; and
a pressure release valve that releases pressure out of the case, wherein:
the pressure release valve includes arc portions and straight portions, wherein the arc portion and the straight portion are parts of a rim of the pressure release valve;
the pressure release valve includes an intersecting groove, which includes a center;
the intersecting groove includes linear grooves, which intersect at the center, arcuate grooves, which extend along the arc portions and are connected to ends of the linear grooves at opposite sides of the center, and straight grooves, which extend along the straight portions and are connected to the ends of the linear grooves; and
an angle of an opening width of the linear grooves is constant along a length of the linear grooves.

3. An electric storage device comprising:
an electrode assembly;
a case that accommodates the electrode assembly; and
a pressure release valve that releases pressure out of the case, wherein:
the pressure release valve includes an arc portion, wherein the arc portion is at least part of a rim of the pressure release valve;
the pressure release valve includes an intersecting groove, which includes a center;
the intersecting groove includes linear grooves, which intersect at the center, arcuate grooves, which extend along the arc portion and are connected to ends of the linear grooves at opposite sides of the center;
the arcuate grooves are arranged along parts of the arc portions without the arcuate grooves being connected to each other; and
an angle of an opening width of the linear grooves is constant along a length of the linear grooves.

4. The electric storage device according to claim 1, wherein the rim of the pressure release valve is track-shaped and includes parallel straight portions and the arc portion, which connects the straight portions.

5. An electric storage device comprising:
an electrode assembly;
a case that accommodates the electrode assembly; and
a pressure release valve that releases pressure out of the case, wherein:
the pressure release valve includes a groove, which includes a rupture initiation point; and
the groove includes an angle varying portion where an angle of opening ends decreases at two sides of the groove relative to a deepest portion of the groove between an end of the groove and the rupture initiation point.

6. The electric storage device according to claim 5, wherein:
the groove is an intersecting groove, and
the rupture initiation point is an intersection of the intersecting groove.

7. The electric storage device according to claim 5, wherein the angle varying portion is located in a range from the end to the rupture initiation point.

8. The electric storage device according to claim 5, wherein the angle varies at a constant rate in the angle varying portion.

9. An electric storage device comprising:
an electrode assembly;
a case that accommodates the electrode assembly; and
a pressure release valve that releases pressure out of the case, wherein:
the pressure release valve includes a first groove, which includes a rupture initiation point, and a second groove, which is free from the rupture initiation point;
the first groove has a first angle of opening ends at two sides of the first groove relative to a deepest portion of the first groove;
the second groove has a second angle of opening ends at two sides of the second groove relative to a deepest portion of the second groove; and
the first angle is smaller than the second angle.

10. The electric storage device according to claim 9, wherein the first groove includes an angle varying portion that decreases the first angle between an end of the first groove and the rupture initiation point.

11. The electric storage device according to claim 1, wherein the electric storage device is a rechargeable battery.

12. The electric storage device according to claim 2, wherein the rim of the pressure release valve is track-shaped and includes parallel straight portions and the arc portion, which connects the straight portions.

13. The electric storage device according to claim 3, wherein the rim of the pressure release valve is track-shaped and includes parallel straight portions and the arc portion, which connects the straight portions.

14. The electric storage device according to claim 2, wherein the electric storage device is a rechargeable battery.

15. The electric storage device according to claim 3, wherein the electric storage device is a rechargeable battery.

16. The electric storage device according to claim 5, wherein the electric storage device is a rechargeable battery.

17. The electric storage device according to claim 9, wherein the electric storage device is a rechargeable battery.

18. An electric storage device comprising:
an electrode assembly;
a case that accommodates the electrode assembly; and
a pressure release valve that releases pressure out of the case, wherein:

the pressure release valve has a track-shaped rim that includes two parallel straight portions and two arc portions, wherein each of the arc portions is part of a rim of the pressure release valve which connect the straight portions;

the pressure release valve includes an intersecting groove, which includes a center;

the intersecting groove includes linear grooves having a portion near the center that has a larger opening width than a portion at opposite sides of the center;

the intersecting groove includes arcuate grooves, which extend along the arc portions and are connected to ends of the linear grooves;

the intersecting groove includes straight grooves, which extend along the straight portions and are connected to the ends of the linear grooves; and the linear grooves, the arcuate grooves and the straight grooves are continuous with each other.

* * * * *